United States Patent
Lamberts et al.

(10) Patent No.: US 9,676,940 B2
(45) Date of Patent: Jun. 13, 2017

(54) FLOWABLE POLYAMIDES

(71) Applicant: EMS-PATENT AG, Domat/Ems (CH)

(72) Inventors: Nikolai Lamberts, Bonaduz (CH);
Andreas Bayer, Domat/Ems (CH);
Botho Hoffmann, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 0 days.

(21) Appl. No.: 14/873,885

(22) Filed: Oct. 2, 2015

(65) Prior Publication Data
US 2016/0102202 A1 Apr. 14, 2016

(30) Foreign Application Priority Data

Oct. 8, 2014 (EP) .................. 14 188 060

(51) Int. Cl.
C08L 77/00 (2006.01)
C08L 77/06 (2006.01)
C08L 51/00 (2006.01)

(52) U.S. Cl.
CPC ............... C08L 77/06 (2013.01); C08L 77/00 (2013.01); *C08L 51/003* (2013.01); *C08L 2205/06* (2013.01)

(58) Field of Classification Search
CPC ...... C08L 77/06; C08L 77/00; C08L 23/0853; C08L 51/06; C08L 2205/06
USPC ....................................... 524/514
See application file for complete search history.

(56) References Cited

U.S. PATENT DOCUMENTS

| | | | |
|---|---|---|---|
| 3,454,536 A | 7/1969 | Schade et al. | |
| 3,839,296 A | 10/1974 | Campbell | |
| 3,843,611 A | 10/1974 | Campbell | |
| 3,997,625 A | 12/1976 | Ando et al. | |
| 4,607,073 A | 8/1986 | Sakashita et al. | |
| 4,831,106 A | 5/1989 | Kempter et al. | |
| 7,691,943 B2 * | 4/2010 | Hoffmann | C08F 255/00 524/514 |
| 2013/0253115 A1 | 9/2013 | Jeol et al. | |
| 2014/0179866 A1 * | 6/2014 | Pfleghar | C08L 77/06 524/607 |

FOREIGN PATENT DOCUMENTS

| | | |
|---|---|---|
| DE | 1495393 A1 | 4/1969 |
| DE | 19513940 A1 | 1/1996 |
| DE | 102005023420 A1 | 11/2006 |
| DE | 102008032205 A1 | 1/2010 |
| EP | 0129196 A2 | 6/1984 |
| EP | 0129195 A2 | 12/1984 |
| EP | 0299444 A2 | 1/1989 |
| EP | 0334170 A1 | 9/1989 |
| EP | 0359037 A2 | 3/1990 |
| EP | 0976774 A2 | 2/2000 |
| EP | 1767578 A1 | 3/2007 |
| EP | 1801162 A1 | 6/2007 |
| EP | 2746341 A1 | 6/2014 |
| WO | 2014/042943 A1 | 3/2014 |

OTHER PUBLICATIONS

European Search Report of EP14188060 dated May 7, 2015.
Database WPI, week 197612, Thomson Scientific, London, GB; AN 1976-21740X, XP002739287.
M. L. Addonizio et al., "Polyamide 6/ethylene-vinyl acetate copolymer blends: melt rheology and morphology of extruded samples", Journal of Materials Science, May 1989, 24, pp. 2939-2950.

* cited by examiner

*Primary Examiner* — Hui Chin
(74) *Attorney, Agent, or Firm* — Sughrue Mion, PLLC

(57) ABSTRACT

Polyamide molding composition:
(A) 29-89 wt % of at least one partly crystalline thermoplastic homo- or copolyamide selected from: aliphatic polyamide, cycloaliphatic polyamide, partly aromatic polyamide, or a mixture thereof, having a melting temperature ($T_m$) of at least 270° C. and a melting enthalpy in the range of 30-70 J/g, in particular in the range of 40-65 J/g, each measured to ISO standard 11357-3 on the granulate at a heating rate of 20° C./min;
(B) 1-15 wt % of ethylene-vinyl acetate copolymer;
(C) 10-70 wt % of filling and reinforcing materials selected from the following group: fibrous reinforcing materials, particulate fillers and mixtures thereof;
(D) 0-20 wt % of impact modifier other than (B) and/or polymers other than (A);
(E) 0-20 wt % of flame retardant; and
(F) 0-5 wt % of additives,
wherein the sum total of components (A)-(F) is 100 weight percent.

28 Claims, No Drawings

FLOWABLE POLYAMIDES

TECHNICAL FIELD

The present invention relates to flowability-modified high-melting polyamides, to processes for producing same and to moulded parts produced therefrom, and also to the use of ethylene-vinyl acetate copolymers (EVA) to modify the flowability of high-melting polyamides.

PRIOR ART

To produce moulded parts from thermoplastic materials, in particular polyamide materials, the pellets are melted and then introduced into a mould, for example in an injection-moulding process. In order that the molten moulding composition may be efficiently introduced into such a mould even in the case of moulds for complex shapes having low wall thicknesses, low mould temperatures, etc., it is important that the moulding composition should possess good flowability at the processing temperature chosen.

The flowability of polymer melts (melt viscosity) is characterized inter alia with the melt volume rate (MVR), which indicates the flow behaviour of a thermoplastic under certain pressure and temperature conditions. According to ISO 1133, the MVR is determined using a capillary rheometer: the pellet or powder material is melted in a heatable cylinder and forced under a pressure, which is created by an imposed weight, through a defined die (capillary). What is determined as the MVR value is the emerging volume of the polymer melt (extrudate) as a function of time, in the units of $cm^3/10$ min.

The prior art describes a multiplicity of possible ways to improve the flowability of polymer melts, i.e. to reduce the melt viscosity, and hence increase the flow path length in the injection-moulding process.

EP-A-0 334 170 proposes reaction products formed from a basic carboxamide and a phosphorus-containing ester for use as auxiliaries in the flow improvement of solids-containing polymers. An epoxy resin is used as matrix.

EP-A-0 359 037 proposes low molecular weight liquid-crystalline esters and ester amides, each having aromatic nuclei, for use as auxiliaries in the production of easy-flow polyamide moulding compositions. Polyamide 6 is used as matrix.

DE-A-10 2008 032 205 describes polyalkylene glycol esters (PAGE) of low molecular weight as useful flow improvers in polyamides. Polyamide 6 is used as matrix.

By contrast, DE-A-10 2005 023 420 discloses a specifically regulated polyamide oligomer useful as flow improver for highly filled polyamide moulding compositions. A polyamide 12 oligomer is processed in a polyamide 12 matrix.

SUMMARY OF THE INVENTION

It is therefore one object of the present invention to provide improved polyamide moulding compositions as regards processability and, in particular, flowability. This object is achieved by a polyamide moulding composition according to claim 1.

The present invention specifically relates to a polyamide moulding composition consisting of the following components:
- (A) 29-89 wt % of at least one partly crystalline thermoplastic homo- or copolyamide selected from the following group: aliphatic polyamide, cycloaliphatic polyamide, partly aromatic polyamide, or a mixture thereof, having a melting temperature ($T_m$) of at least 270° C. and a melting enthalpy ($\Delta Hm$) in the range of 30-70 J/g, in particular in the range of 40-65 J/g, each measured to ISO standard 11357-3 on the granulate at a heating rate of 20° C./min;
- (B) 1-15 wt % of ethylene-vinyl acetate copolymer;
- (C) 10-70 wt % of filling and reinforcing materials selected from the following group: fibrous reinforcing materials, particulate fillers and mixtures thereof;
- (D) 0-20 wt % of impact modifier other than (B) and/or polymers other than (A);
- (E) 0-20 wt % of flame retardant; and
- (F) 0-5 wt % of additives, wherein the sum total of components (A)-(F) is 100 weight percent.

It is preferably not just component (A) considered alone which has a melting temperature ($T_m$), measured to ISO standard 11357-3 on the granulate at a heating rate of 20° C./min, of at least 270° C., but the entire polyamide moulding composition consisting of components (A)-(F).

When preferred ranges are specified hereinbelow in connection with components (B)-(F), the sum total of components (A)-(F) always remains at 100 weight percent, and preferably the proportion of component (A) adjusts accordingly, although the concentration of (A) never drops below 29 wt % and never exceeds 89 wt %.

It was found that, unexpectedly, ethylene-vinyl acetate copolymer (EVA) as a constituent of the above moulding composition leads to an improvement in flow properties, i.e. to a controlled increase in MVR values and/or flow path lengths. All this—astonishingly—without at the same time adversely affecting the mechanical properties of the final component parts. In the usual scenario, after all, improved flow properties due to appropriate additives come at the disadvantage that the final component part has worse mechanical properties, in particular some embrittlement, particularly when, as proposed above in the prior art, oligomers are admixed, for example. The admixture of EVA thus evidently changes the inner structure, in particular and preferably when the manipulation in the mixer in the course of the production of the polyamide moulding composition, at least in the mixing of components (A) and (B), or in the processing of the polyamide moulding composition or in the processing of a mixture of components (A)-(F) in an injection-moulding machine, for example, takes place in a temperature window of $T_M$ of at least 290° C., for a period (residence time, $t_R$), of the type which occur in customary extrusion or injection-moulding processes, of preferably a few seconds to a few minutes. The residence time $t_R$ is preferably in the range from 10 to 200 seconds.

The temperature $T_M$ is to be understood as referring to the melt temperature of the mixture in the mixer. The time $t_R$ is the average residence time of the mixture in the mixer, in particular the residence time of the mixture in the mixer at a temperature of $T_M$. The melt temperature and the residence time should comply with these conditions in at least one region (zone) of the mixer.

It is accordingly possible, by the controlled admixture of EVA in the claimed quantitative range, to adjust the flow properties of the polyamide to desired values without incurring disadvantageous mechanical properties.

It is believed—without wishing to be tied to any one theoretical explanation—that the production and/or processing of the above-specified moulding composition or the mixture preparation, preferably under the specific above-indicated conditions, are accompanied by a partial decomposition of the EVA with the release of acetic acid to a sufficient degree and the released acetic acid is then able to react with the polyamide matrix to a sufficient degree. The virtual attack of the acetic acid on the polyamide matrix appears to cause some partial degradation and hence some improvement in the flow properties and/or some increase in the MVR values without simultaneously reducing the mechanical properties.

There are already disclosures describing low-melting polyamide-EVA mixtures, mainly in the field of hot-melt adhesives or self-supporting film/sheet. Low temperatures are chosen to produce and process these mixtures and hence there is no decomposition nor any reaction of any decomposition products with the polyamide, i.e. the melt viscosity does not change. In addition, the moulding compositions are usually unreinforced moulding compositions.

U.S. Pat. No. 3,997,625 may be mentioned as illustrative of such hot-melt adhesives because it describes hot-melt adhesives consisting of a mixture of low-melting copolyamide 12/6/66 and at least 20% of ethylene-vinyl acetate copolymer containing 5-20% of vinyl acetate. Processing takes place at 180° C.

EP-A-0 771 853 describes a polyamide moulding composition for the production of films having good optical properties and good resistance to holing under repeated mechanical stress, containing 93-99.5% of polyamide and 0.5-7% of an acid-modified, partially saponified polyethylene vinyl acetate. The vinyl acetate content is 20-50%, the degree of saponification is 50-95%. An enumeration of polyamides recites 6/6T as the only partly aromatic system. No melting point is reported for 6/6T, it can be between wide limits and below 250° C. Unreinforced polyamide 6 is used as matrix, and the processing takes place at a temperature of not more then 250° C.

EP-A-1 767 578 describes moulding compositions comprising polyamide, impact modifier, compatibilizer, fillers and conductivity additives and EVA, which may be in partially saponified form. Merely polyamide 6 is used as principal component of the polyamide matrix, the melting point of which is 220° C., as will be known. Partly aromatic polyamides are not recited as principal components of the polyamide. The material is processed at a temperature of 230° C. The comparison between Example 1 (Tab. 1) and Comparative Example 1 (Tab. 3) shows that the melt viscosity on addition of 2.5% of EVA remains unchanged at 50 g/10 min (MVR), i.e. no reduction in melt viscosity was engendered.

Addonizio et al. in Journal of Materials Science 24 (1989) 2939-2950 concern themselves with the rheology of PA6 and EVA blends formed at a temperature of 240° C. Blend shear viscosities are consistently higher with standard-viscosity EVA versus pure PA6.

Some prior art documents mention a very wide variety of polyamides as matrix. EP-A-1 801 162, for example, relates to polyamide-EVA blends containing 30-80% of polyamide, 10-69% of a crosslinked EVA and 1-10% of an acid-modified EVA as compatibilizer. The matrix is exclusively PA12, known to have a melting point of somewhat below 180° C., and so the processing takes place in the region of its melting point, i.e. at somewhat above about 180° C., no fibrous reinforcement is present or claimed. The moulding compositions are stated to have minimal oil swelling. There is no suggestion of any flow improvement for the moulding composition, unsurprisingly, since decomposition cannot take place at these processing temperatures.

US-A-2013/0253115 relates to heat-stabilized polyamide moulding compositions containing 3-10% of impact improver and polyhydroxy compounds as well as polyamide. The polyamide of said moulding composition is in fact 66/6T, and the processing takes place at 280° C. with glass fibres, an MA-grafted ethylene-propylene copolymer and a heat-stabilizing system comprising dipentaerythritol and CuI/KI.

Component (A):

Component (A) of the polyamide moulding composition comprises 29-89 wt % of at least one thermoplastic homo- or copolyamide selected from the following group: aliphatic polyamide, cycloaliphatic polyamide, partly aromatic polyamide, or a mixture thereof.

In one preferred embodiment, matrix (A) used in the polyamide moulding compositions is based on at least one high-melting polyamide having a melting temperature ($T_m$) measured to ISO standard 11357-3 on the granulate at a heating rate of 20° C./min in the range of 280° C.-340° C., preferably in the range of 290° C.-330° C., or a mixture of such polyamides. When a mixture is present as component (A) it is preferably not just the mixture which has the claimed minimum melting point, but also each and every one of the individual components within (A).

As already mentioned above, component A may be based not only on at least one aliphatic, cycloaliphatic polyamide but also on at least one partly aromatic partially crystalline polyamide having the stated melting point range. Mixtures of such systems are likewise possible, in which case it is preferable for the mixtures to be based in the main on at least one partly aromatic partly crystalline polyamide.

The aliphatic polyamides for component (A), having the stated melting point range, are selected from the group: PA 46, PA 46/66, PA 46/56. Of these, PA 46 is preferred, optionally in admixture with a partly crystalline partly aromatic polyamide.

In a further preferred embodiment, said partly aromatic, partly crystalline polyamide component (A) preferably consists essentially of only at least one partly crystalline, partly aromatic polyamide, constructed from:

(A1) 25-100 mol % of terephthalic acid, based on the overall content of acids present,
  0-75 mol %, based on the overall content of acids present, of at least one dicarboxylic acid selected from the group: aromatic dicarboxylic acid of 8 to 20 carbon atoms other than terephthalic acid, aliphatic dicarboxylic acid of 6 to 36 carbon atoms, cycloaliphatic dicarboxylic acid of 8 to 20 carbon atoms, or a mixture thereof, (A2) 25-100 mol %, based on the overall content of diamines present, of at least one aliphatic diamine having 4 to 36 carbon atoms,
  0-75 mol %, based on the overall content of diamines present, of at least one diamine selected from the group: cycloaliphatic diamine of 6 to 20 carbon atoms, araliphatic diamine of 8-20 carbon atoms,
  wherein the percentage molar content of dicarboxylic acids is 100% and the percentage molar content of diamines is 100%, and also from:

(A3) 0-100 mol % of amino carboxylic acids and/or lactams of 6 to 12 carbon atoms.

This is subject to the proviso that the concentration of (A3) is at most 40 wt %, preferably at most 30 wt % and more preferably at most 20 wt % based on the sum total of (A1) to (A3).

The high-melting polyamide (component A) in a preferred embodiment has a solution viscosity, measured to ISO 307 in m-cresol (0.5 wt %, 20° C.), of $\eta_{rel}$ below 2.6, preferably of $\eta_{rel}$ below 2.3, in particular of $\eta_{rel}$ below 2.0 and of $\eta_{rel}$ at least 1.4, preferably of $\eta_{rel}$ at least 1.5, in particular of $\eta_{rel}$ at least 1.55.

Component (A) is thus preferably based on a polyphthalamide. Polyphthalamides are polyamides based on terephthalic acid and aliphatic or cycloaliphatic diamines and optionally further aliphatic, cycloaliphatic or aromatic dicarboxylic acids and also lactams and/or amino carboxylic acids.

The high-melting polyamide is generally a polyamide based on aromatic dicarboxylic acids and aliphatic diamines. Some of the aromatic dicarboxylic acids may be replaced by aliphatic and/or cycloaliphatic dicarboxylic acids, and some of the aliphatic diamines may be replaced by cycloaliphatic and/or araliphatic diamines. Lactams and/or amino carboxylic acids may also be substituted for some of the dicarboxylic acids and diamines.

Therefore, the high-melting polyamides of component (A) are preferably formed from the following components:
(A1) Dicarboxylic acids:
50-100 mol % of terephthalic acid, based on the overall content of acids present, 0-50 mol %, based on the overall content of acids present, of another aromatic dicarboxylic acid of 8 to 20 carbon atoms and/or an aliphatic dicarboxylic acid of 6 to 36 carbon atoms and/or a cycloaliphatic dicarboxylic acid of 8 to 20 carbon atoms, or a mixture of such systems
(A2) Diamines:
50-100 mol %, based on the overall content of diamines present, of at least one aliphatic diamine having 4 to 36 carbon atoms,
0-50 mol %, of cycloaliphatic diamines of 6 to 20 carbon atoms and/or araliphatic diamines of 8 to 20 carbon atoms, such as e.g. MXDA and PXDA, or a mixture of such cycloaliphatic or araliphatic systems,
wherein, in the high-melting polyamides, the percentage molar content of dicarboxylic acids is 100% and the percentage molar content of diamines is 100% and, optionally from:
(A3) Amino carboxylic acids and/or lactams, containing 0-100 mol % of lactams of 6 to
12 carbon atoms, and/or amino carboxylic acids of 6 to 12 carbon atoms.

While components (A1) and (A2) are used in substantially equimolar amounts, the concentration of (A3) is in any event at most 40 wt %, preferably at most 30 wt %, more preferably at most 20 wt % based on the sum total of (A1) to (A3).

In addition to the substantially equimolar components (A1) and (A2) used, dicarboxylic acids (A1) or diamines (A2) may be employed to regulate the molar mass or to rectify monomer losses in the polyamide production, so the concentration of a A1 or A2 component may predominate overall.

Some of the terephthalic acid (TA), specifically up to 50 mol %, preferably up to 48 mol % and more preferably up to 46 mol %, may be replaced by other aromatic, aliphatic or cycloaliphatic dicarboxylic acids having 6 to 36 carbon atoms (based on the overall amount of dicarboxylic acids).

Suitable aromatic dicarboxylic acids include naphthalenedicarboxylic acid (NDA) and isophthalic acid (IPA).

Suitable aliphatic dicarboxylic acids are adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid and dimer fatty acid (C36). Suitable cycloaliphatic dicarboxylic acids are cis- and/or trans-cyclohexane-1,4-dicarboxylic acid and/or cis- and/or trans-cyclohexane-1,3-dicarboxylic acid (CHDA).

The diamines used at 50-100 mol % in component A2 are preferably selected from the group: 1,4-butanediamine, 1,5-pentanediamine, 1,6-hexanediamine, 2-methyl-1,5-pentanediamine (MPD), 1,7-heptanediamine, 1.8-octanediamine, 1,9-nonanediamine, 2-methyl-1,8-octanediamine, 2,2,4-trimethylhexamethylenediamine, 2,4,4-trimethyl-hexamethylenediamine, 5-methyl-1,9-nonanediamine, 1,10-decanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine, 1,18-octadecanediamine. Preferred among these are the diamines 1,6-hexanediamine, 2-methyl-1,5-pentanediamine, 1,9-nonanediamine, 2-methyl-1,8-octanediamine, 1,10-decanediamine and 1,12-dodecanediamine, in particular 1,6-hexanediamine and 1,10-decanediamine.

The abovementioned aliphatic diamines may be replaced by other diamines to a minor extent, i.e. specifically to an extent of not more than 50 mol %, preferably not more than 40 mol % and more preferably not more than 30 mol %, all based on the overall amount of diamines.

Useful cycloaliphatic diamines preferably include cyclohexanediamine, 1,3-bis-(aminomethyl)cyclohexane (BAC), isophoronediamine, norbornanedimethylamine, 4,4'-diaminodicyclohexylmethane (PACM), 2,2-(4,4'-diaminodicyclohexyl)propane (PACP), bis(4-amino-3-ethylcyclohexyl)methane (EACM), bis(4-amino-3,5-dimethylcyclohexyl)methane (TMDC) and 3,3'-dimethyl-4,4'-diaminodicyclohexylmethane (MACM).

Useful araliphatic diamines preferably include m-xylylenediamine (MXDA) and p-xylylenediamine (PXDA).

In addition to the dicarboxylic acids and diamines described, it is also possible to employ lactams and/or amino carboxylic acids as polyamide-forming components (component A3) to a certain, restricted extent. Suitable compounds are preferably caprolactam (CL), $\alpha,\omega$-aminocaproic acid, $\alpha,\omega$-aminononanoic acid, $\alpha,\omega$-aminoundecanoic acid (AUA), laurolactam (LL) and $\alpha,\omega$-aminododecanoic acid (ADA). But the concentration of the amino carboxylic acids and/or lactams employed together with components (A1) and (A2) is at most 40 wt %, preferably at most 30 wt % and more preferably at most 20 wt % based on the sum total of components (A1) and (A2).

The specific preference in lactams is for lactams and/or $\alpha,\omega$-amino acids having 4, 6, 7, 8, 11 or 12 carbon atoms. These include, for example, lactams 2-pyrrolidinone (4 carbon atoms), $\epsilon$-caprolactam (6 carbon atoms), enantholactam (7 carbon atoms), capryllactam (8 carbon atoms), laurolactam (12 carbon atoms) and/or the $\alpha,\omega$-amino acids 1,4-amino-butanoic acid, 1,6-aminohexanoic acid, 1,7-aminoheptanoic acid, 1,8-aminooctanoic acid, 1,11-aminoundecanoic acid and 1,12-aminododecanoic acid.

Because diamines are more volatile compounds than dicarboxylic acids, a diamine loss is typically incurred during the production process. To rectify the diamine loss, therefore, it is preferred to add a diamine excess of 1 to 8 wt %, based on the overall amount of diamines, to the monomer batch. The diamine excess also serves to regulate the molecular weight and the distribution of the end groups.

To regulate the molar mass, the relative viscosity and/or the flowability or MVR, regulators in the form of monocarboxylic acids or monoamines may be added to the starting batch and/or the precondensate (prior to the post-condensation). Suitable regulators include aliphatic, cycloaliphatic or aromatic monocarboxylic acids or monoamines in the form of acetic acid, propionic acid, butyric acid, valeric acid, caproic acid, lauric acid, stearic acid, 2-ethylhexanoic acid, cyclohexanoic acid, benzoic acid, butylamine, pentylamine, hexylamine, 2-ethylhexylamine, n-octylamine, n-dodecylamine, n-tetradecylamine, n-hexadecylamine, stearylamine, cyclohexylamine, 3-(cyclohexylamino)propylamine, methylcyclohexylamine, dimethylcyclohexylamine, benzylamine, 2-phenylethylamine, and so on. The regulators may be used singly or combined. Useful regulators further include other monofunctional compounds capable of reacting with an amino or acid group, such as anhydrides, isocyanates, acyl halides or esters. Regulator usage is preferably between 10 and 200 mmol per kg of polymer.

The partly aromatic copolyamides (A) are obtainable using processes known per se. Suitable processes are described in various places, and some of the possibilities will now be described hereinbelow, while the disclosure of the hereinbelow cited patent documents as regards the process for producing the copolyamide of component A of the present invention is expressly incorporated in the disclosure of the present application by reference: DE 195 13 940, EP 0 976 774, EP 0 129 195, EP 0 129 196, EP 0 299 444, U.S. Pat. No. 4,831,106, U.S. Pat. No. 4,607,073, DE 14 95 393 and U.S. Pat. No. 3,454,536.

A preferred way of suitably producing component (A) is a two-step process of first producing a low molecular weight precondensate of low viscosity and then post-condensing same in the solid state or in the melt (in an extruder, for example). Another possibility is a three-step process of 1st precondensation, 2nd solid state polymerization and 3rd melt polymerization as disclosed for example in DE 696 30 260, the disclosure of which in this regard is hereby likewise incorporated herein by reference.

Products having melting points below 300° C. are suitably also obtainable by the one-step batch process described in U.S. Pat. No. 3,843,611 and U.S. Pat. No. 3,839,296 again, which is in this regard likewise incorporated herein by reference and in which the mixture of the monomers or their salts is heated to temperatures of 250 to 320° C. for 1 to 16 hours while the pressure is reduced from a maximum to the lowest pressure of down to 1 mm Hg by evaporating off gaseous material with or without the use of an inert gas.

In general terms therefore, a preferred embodiment of the polyamide moulding composition regarding component (A1) is characterized in that, the component (A1) dicarboxylic acid other than terephthalic acid is selected from the group: naphthalenedicarboxylic acid, isophthalic acid, adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, dimeric fatty acid (C36), cis- and/or trans-cyclohexane-1,4-dicarboxylic acid, cis- and/or trans-cyclohexane-1,3-dicarboxylic acid, and/or mixtures thereof.

A preferred embodiment of the polyamide moulding composition as regards component (A2) is characterized in that the aliphatic diamine of component (A2) is selected from the group: 1,4-butanediamine, 1,5-pentanediamine, 1,6-hexanediamine, 2-methyl-1,5-pentanediamine, 1,7-heptanediamine, 1,8-octanediamine, 1,9-nonanediamine, 2-methyl-1,8-octanediamine, 2,2,4-trimethylhexamethylenediamine, 2,4,4-trimethyl-hexamethylenediamine, 5-methyl-1,9-nonanediamine, 1,10-decanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine, 1,18-octadecanediamine or a mixture thereof, wherein the following group is preferable: 1,6-hexanediamine, 2-methyl-1,5-pentanediamine, 1,9-nonanediamine, 2-methyl-1,8-octanediamine, 1,10-decanediamine and 1,12-dodecanediamine, in particular 1,6-hexanediamine and 1,10-decanediamine, or a mixture thereof.

A further preferred embodiment of the polyamide moulding composition as regards component (A2) is characterized in that the cycloaliphatic and/or araliphatic diamine of component (A2) is selected from the group: cyclohexanediamine, 1,3-bis(aminomethyl)cyclohexane, isophoronediamine, norbornanedimethylamine, 4,4'-diaminodicyclohexylmethane, 2,2-(4,4'-diaminodicyclohexyl)propane, and 3,3'-dimethyl-4,4'-diaminodicyclohexylmethane, m-xylylenediamine and p-xylylenediamine, or a mixture thereof.

A further preferred embodiment of the polyamide moulding composition as regards component (A3) is characterized in that component (A3) is selected from the group: caprolactam, $\alpha,\omega$-aminocaproic acid, $\alpha,\omega$-aminononanoic acid, $\alpha,\omega$-aminoundecanoic acid, laurolactam, $\alpha,\omega$-aminododecanoic acid, $\alpha,\omega$-amino acids having 4, 6, 7, 8, 11 or 12 carbon atoms, in particular 2-pyrrolidinone, $\epsilon$-caprolactam, enantholactam, capryllactam, laurolactam, 1,4-aminobutanoic acid, 1,6-aminohexanoic acid, 1,7-aminoheptanoic acid, 1,8-aminooctanoic acid, 1,11-aminoundecanoic acid and 1,12-aminododecanoic acid, or a mixture thereof.

Specific representatives of the partly aromatic polyamides according to the invention are for example the following systems or mixtures (blends) thereof: PA 4T/46, PA 4T/66, PA 4T/4I, PA 4T/4I/46, PA 4T/46/66, PA 4T/4I/66, PA 4T/56, PA 5T/56, PA 5T/5I, PA 5T/66, PA 6T/6I, PA 6T/66, PA 6T/610, PA 6T/612, PA 6T/12, PA 6T/11, PA 6T/6, PA 6T/10T, PA 6T/10I, PA 6T/106, PA 6T/1010, PA 6T/66/106, PA 10T/66, PA 10T/612, PA 10T/1010, PA 10T/1012, PA 10T/10I, PA 10T/12, PA 10T/11, PA 6T/MACM10, PA 6T/MACM12, PA 6T/MACM18, PA 6T/MACMI, PA MACMT/6I, PA 6T/PACM6, PA 6T/PACM10, PA 6T/PACM12, PA 6T/PACM18, PA 6T/PACMI, PACMT/6I, PA MPDT/MPDI, PA MPDT/MPD6, PA 6T/MPDI, PA 6T/MPDT (MPD=2-methylpentanediamine), PA 6T/9T, PA 6T/12T, PA 6T/6I/66, PA 6T/6I/6, PA 6T/6I/12, PA 6T/66/6, PA 6T/66/12, PA 6T/6I/MACMI, PA 6T/66/PACM6. In one preferred embodiment, the proportion of terephthalic acid in component A1 is at least 50 mol %, preferably at least 52 mol %, more preferably at least 54 mol % and most preferably at least 62 mol %, and in that component A2 preferably consists exclusively of hexamethylenediamine or exclusively of 2-methyl-1,5-pentanediamine or exclusively of a mixture of hexamethylenediamine and 2-methyl-1,5-pentanediamine.

The preference of the present invention for use as high-melting polyamides (A) is therefore particularly for the following partly aromatic copolyamides:
  partly crystalline polyamide formed from at least 50 mol % of terephthalic acid and hexamethylenediamine, as sole diamine component;
  partly crystalline polyamide formed from at least 52 mol % of terephthalic acid and hexamethylenediamine;
  partly crystalline polyamide formed from at least 54 mol % of terephthalic acid and hexamethylenediamine;
  partly crystalline polyamide formed from at least 62 mol % of terephthalic acid and hexamethylenediamine;
  partly crystalline polyamide formed from at least 60-70 mol % of terephthalic acid, 20-30 mol % of isophthalic acid, 5-15 mol % of adipic acid and hexamethylenediamine;

partly crystalline polyamide formed from at least 50 mol % of terephthalic acid and 2-methyl-1,5-pentanediamine;

partly crystalline polyamide formed from at least 50 mol % of terephthalic acid and a mixture of hexamethylenediamine and 2-methyl-1,5-pentanediamine.

In a further preferred embodiment, the proportion of terephthalic acid in component (A1) is at least 50 mol %, wherein the aliphatic diamine hexamethylenediamine comprises a proportion of at least 10 mol %, preferably at least 15 mol %, and more preferably at least 50 mol %, within component (A2), and in that the remaining proportion of diamine is selected from the group: nonanediamine, methyloctanediamine, decanediamine, dodecane-diamine, trimethylhexamethylenediamine, m-xylylenediamine, bis(4-amino-cyclohexyl)methane, bis(4-amino-3-methylcyclohexyl)methane, or a mixture thereof, wherein it is preferably only one system from this group which is employed in a mixture with hexamethylenediamine.

The preference of the present invention for use as high-melting polyamides (A) is therefore further for particularly the following partly aromatic copolyamides:

partly crystalline polyamide formed from 50-100 mol % of terephthalic acid and a mixture of at least two diamines selected from the group: hexamethylenediamine, nonanediamine, methyloctanediamine, decanediamine and dodecanediamine, wherein preferably the diamines nonanediamine and methyloctanediamine on the one hand and decanediamine and hexanediamine on the other are combined in each case;

partly crystalline polyamide formed from at least 50 mol % of terephthalic acid and a mixture of hexamethylenediamine and decanediamine, wherein at least 10 mol %, preferably at least 15 mol % and more preferably at least 50 mol % of hexamethylenediamine is used, based on the overall diamine content;

partly crystalline polyamide prepared from at least 80 mol %, preferably 100 mol % of terephthalic acid and from 10-60 mol % of hexamethylenediamine and 40-90 mol % of decanediamine, partly crystalline polyamide prepared from at least 50 mol % of terephthalic acid and a mixture of hexamethylenediamine and trimethylhexamethylenediamine, wherein at least 10 mol %, preferably at least 15 mol % and more preferably at least 50 mol % of hexamethylenediamine is used, based on the overall diamine content;

partly crystalline polyamide formed from at least 50 mol % of terephthalic acid and a mixture of hexamethylenediamine and m-xylylenediamine, wherein at least 10 mol %, preferably at least 15 mol % and more preferably at least 50 mol % of hexamethylenediamine is used, based on the overall diamine content;

partly crystalline polyamide formed from at least 50 mol % of terephthalic acid and a mixture of hexamethylenediamine and bis(4-aminocyclohexyl)methane, wherein at least 10 mol %, preferably at least 15 mol % and more preferably at least 50 mol % of hexamethylenediamine is used, based on the overall diamine content;

partly crystalline polyamide formed from at least 50 mol % of terephthalic acid and a mixture of hexamethylenediamine and bis(4-amino-3-methylcyclohexyl)methane, wherein at least 10 mol %, preferably at least 15 mol % and more preferably at least 50 mol % of hexamethylenediamine is used, based on the overall diamine content.

A further preferred embodiment of the polyamide moulding composition is characterized in that component (A) is formed by a partly crystalline polyamide 6T/6I having 50 to 80 mol % of hexamethyleneterephthalamide units and 20 to 50 mol % of hexamethyleneisophthalamide units, preferably having 55 to 75 mol % of hexamethyleneterephthalamide units and 25 to 45 mol % of hexamethyleneisophthalamide units, more preferably having 62 to 73 mol % of hexamethyleneterephthalamide units and 25 to 38 mol % of hexamethyleneisophthalamide units.

The preference of the present invention for use as high-melting polyamides (A) is therefore further for particularly the following partly aromatic copolyamides:

partly crystalline polyamide 6T/6I having 50 to 80 mol % of hexamethyleneterephthalamide units and 20 to 50 mol % of hexamethyleneisophthalamide units;

partly crystalline polyamide 6T/6I having 55 to 75 mol % of hexamethyleneterephthalamide units and 25 to 45 mol % of hexamethyleneisophthalamide units;

partly crystalline polyamide 6T/6I having 62 to 73 mol % of hexamethyleneterephthalamide units and 25 to 38 mol % of hexamethyleneisophthalamide units;

partly crystalline polyamide 6T/6I having 70 mol % of hexamethyleneterephthalamide units and 30 mol % of hexamethyleneisophthalamide units.

A further preferred embodiment of the polyamide moulding composition is characterized in that component (A) is formed by a partly crystalline polyamide 6T/66 having 50 to 80 mol % of hexamethyleneterephthalamide units and 20 to 50 mol % of hexamethyleneadipamide units, preferably having 50 to 65 mol % of hexamethyleneterephthalamide units and 35 to 50 mol % of hexamethyleneadipamide units, more preferably having 52 to 62 mol % of hexamethyleneterephthalamide units and 38 to 48 mol % of hexamethyleneadipamide.

The preference of the present invention for use as high-melting polyamides (A) is therefore additionally for particularly the following partly aromatic copolyamides:

partly crystalline polyamide 6T/66 having 50 to 80 mol % of hexamethyleneterephthalamide units and 20 to 50 mol % of hexamethyleneadipamide (66) units;

partly crystalline polyamide 6T/66 having 50 to 65 mol % of hexamethyleneterephthalamide units and 35 to 50 mol % of hexamethyleneadipamide (66) units;

partly crystalline polyamide 6T/66 having 52 to 62 mol % of hexamethyleneterephthalamide units and 38 to 48 mol % of hexamethyleneadipamide (66) units;

partly crystalline polyamide 6T/66 having 55 mol % of hexamethyleneterephthalamide units and 45 mol % of hexamethyleneadipamide (66) units.

In a further preferred embodiment, component (A) may also be formed by a partly crystalline ternary polyamide.

It is accordingly further preferable for component (A) to be formed by a partly crystalline ternary polyamide 6T/6I/66 having 50 to 70 mol % of hexamethyleneterephthalamide units, 5 to 45 mol % of hexamethyleneisophthalamide units and 5 to 45 mol % of hexamethyleneadipamide units.

It is likewise preferable for component (A) to be formed by a 6T/6I/X having at least 50 mol % of hexamethyleneterephthalamide units, 0 to 40 mol % of hexamethyleneisophthalamide units and 10 to 50 mol % of aliphatic units of the formula $NH-(CH_2)_n-1-CO-$, where $n=6$, 11 or 12.

It is likewise preferable for component (A) to be formed by a 6T/6I/X having at least 50 mol % of hexamethyleneterephthalamide units, 10 to 30 mol % of hexamethyleneisophthalamide units and 10 to 40 mol % of aliphatic units of the formula —NH—(CH$_2$)$_n$-1-CO—, where n is equal to 6, 11 or 12.

It is likewise preferable for component (A) to be formed by a 6T/6I/X having 52 to 73 mol % of hexamethyleneterephthalamide units, 0 to 36 mol % of hexamethyleneisophthalamide units and 12 to 48 mol % of aliphatic units of the formula —NH—(CH$_2$)$_n$-1-CO—, where n is equal to 6, 11 or 12.

It is likewise preferable for component (A) to be formed by a 6T/6I/X having 52 to 73 mol % of hexamethyleneterephthalamide units, 10 to 36 mol % of hexamethyleneisophthalamide units and 12 to 38 mol % of aliphatic units of the formula —NH—(CH$_2$)$_n$-1-CO—, where n is equal to 6, 11 or 12.

In a further preferred embodiment, component A is based on a partly aromatic and partly crystalline polyamide containing up to 26 mol % of aliphatic units obtainable by condensation of dimerized fatty acids having up to 44 carbon atoms and an aliphatic or cycloaliphatic diamine, in particular with hexamethylenediamine.

Component (B):

Component (B) in the moulding composition comprises 1-15 wt % of ethylene-vinyl acetate copolymer (EVA). This ethylene-vinyl acetate copolymer (EVA) may be in a partially saponified form.

A preferred embodiment is characterized in that the proportion of component (B) is in the range of 1.5-10 wt %, preferably in the range of 2-6 wt %.

A further preferred embodiment is characterized in that said component (B) is an ethylene-vinyl acetate copolymer having a vinyl acetate content of 5-35%, preferably 8-25%, more preferably 10-20%, wherein the percentages are each based on the overall mass of ethylene-vinyl acetate copolymer, including any graft present.

The EVA preferably has a molar mass in the range of 20 000-500 000 g/mol, more preferably in the range of 30 000-300 000 g/mol.

In a further preferred embodiment, the ethylene-vinyl acetate copolymer is grafted, in particular to improve the compatibility with the polyamide.

The ethylene-vinyl acetate copolymer preferably has acid or acid anhydride groups introduced, by thermal or free-radical reaction of the main chain polymer with an unsaturated dicarboxylic anhydride, unsaturated dicarboxylic acid or an unsaturated monoalkyl dicarboxylate, in a concentration sufficient for good attachment to the polyamide. It is preferable to use reagents selected from the following group: acrylic acid, methacrylic acid, maleic acid, maleic anhydride, monobutyl maleate, fumaric acid, aconitic acid, glycidyl acrylate, glycidyl methacrylate and/or itaconic anhydride. It is preferable for from 0.1 to 6.0 wt % of these reagents, preferably of unsaturated anhydride or of an unsaturated carboxylic acid, to be grafted onto the ethylene-vinyl acetate copolymers, or carboxylic acid or dicarboxylic anhydride or its precursor is grafted together with a further unsaturated monomer.

The graft is more preferably carried out with a reagent selected from the following group: acrylic acid, methacrylic acid, maleic anhydride or combinations thereof, preferably the graft is selected as acrylic acid.

The ethylene-vinyl acetate copolymer preferably has a graft in the range of 0.2-4.0 wt %, more preferably in the range of 0.5-2.5 wt %, wherein the weight percentages are each based on the overall mass of ethylene-vinyl acetate copolymer, including graft.

The moulding composition is preferably free from further compatibilizer when the EVA used is grafted.

Any saponification of the EVA is further preferably less than 30%, more preferably less than 10%, i.e. the proportion of vinyl alcohol groups in relation to the sum total of vinyl acetate and vinyl alcohol groups in the EVA (component B) is less than 30 mol %, more preferably less than 10 mol %. It is particularly preferable for the EVA to be unsaponified, i.e. for its degree of saponification to be 0%, and hence not to contain any or virtually no vinyl alcohol groups.

The EVA is further preferably uncrosslinked, i.e. the moulding compositions are free from crosslinkers and free-radical formers.

Preference is given to using an EVA whose ethylene content is 79-86 wt %, whose vinyl acetate content is 13-18 wt % and whose acrylic acid graft comprises 1-3 wt % (all based on the overall weight).

Examples of commercially available EVA systems include: Scona TPEV 1110 PB, Scona TPEV 1112 PB, Scona TPEV 2113 PB, Scona TPEV 5010 PB, Evatane 18-150, Evatane 20-20, Evantane 28-40, Ultrathene UE672, Ultrathene UE635000, Atea 1075A, Atea 1241, Atea 2842AC.

Component (C):

Component (C) is present in a proportion of preferably 15-65 wt %, more preferably in the range of 20-60 wt %.

In component (C), the fibrous reinforcing materials are preferably selected from the following group: glass fibres, basalt fibres, titanate whiskers, carbon fibres, graphite fibres, aramid fibres, nanotubes, or mixtures and/or surface-treated forms thereof, each of circular or non-circular cross-sectional area, wherein it is preferably glass fibres which are selected, and wherein in the case of flat glass fibres it is preferably those having a dimensional ratio of more than 2, preferably of 2 to 8, in particular of 2 to 5, between the principal cross-sectional axis and the perpendicular secondary cross-sectional axis thereon which are used. It is further preferable for the particulate fillers in component (C) to be selected from the group consisting of: titanium dioxide, zinc sulphide, barium sulphate, barium titanate, talc, mica, silicates, quartz, glass spheres, glass flakes, wollastonite, kaolin, silicas, magnesium carbonate, magnesium hydroxide, chalk, ground or precipitated calcium carbonate, lime, feldspar, metal powder, in particular iron powder, inorganic pigments, in particular iron oxide, iron manganese oxide, metal oxides, in particular spinets, in particular copper iron spinel, copper chromium oxide, copper chromite (CuCr$_2$O$_4$), zinc iron oxide, cobalt chromium oxide, cobalt aluminium oxide, magnesium aluminium oxide, copper chromium manganese mixed oxides, copper manganese iron mixed oxides, nickel antimony titanate, chromium antimony titanate, hard- or soft-magnetic metals or alloys/ceramics, hollow-sphere silicate fillers, alumina, boron nitride, boron carbide, aluminium nitride, calcium fluoride and mixtures or surface-treated forms thereof.

It is further preferred when the ratio of the fibrous additives to the particulate additives is in the range from 30:1 to 1:30, preferably in the range from 10:1 to 1:10 or in the range from 5:1 to 1:5. It is particularly preferred for component (C) to be formed exclusively by fibrous additives, i.e. for the moulding composition not to contain any particulate fillers.

It is preferable for component (C) to be a glass fibre constructed or consisting essentially of the components silicon dioxide, calcium oxide, magnesium oxide and aluminium oxide, and for the weight ratio SiO$_2$/(CaO+MgO) to be below 2.7, preferably below 2.5 and more preferably between 2.1 and 2.4. Component B1 is particularly an E-glass fibre in accordance with ASTM D578-00.

For the purposes of the present invention, the glass fibre may also be a high-strength glass fibre, preferably based on the ternary system of silicon dioxide/aluminium oxide/magnesium oxide or on the quaternary system of silicon dioxide/aluminium oxide/magnesium oxide/calcium oxide, in which case a composition of 58-70 wt % of silicon dioxide ($SiO_2$), 15-30 wt % of aluminium oxide ($Al_2O_3$), 5-15 wt % of magnesium oxide (MgO), 0-10 wt % of calcium oxide (CaO) and 0-2 wt % of further oxides, for example zirconium dioxide ($ZrO_2$), boron oxide ($B_2O_3$), titanium dioxide ($TiO_2$) or lithium oxide ($Li_2O$), is preferred. The high-strength glass fibre preferably has a tensile strength of not less than 4000 MPa, and/or an at least 5% elongation at break and an above 80 GPa tensile modulus of elasticity. Specific examples of these high-strength glass fibres of component (C) are S-glass fibres from Owens Corning with 910 or 995 size, T-glass fibres from Nittobo, HiPertex from 3B, HS4-glass fibres from Sinoma Jinjing Fiberglass, R-glass fibres from Vetrotex and also S-1- and S-2-glass fibres from AGY.

The glass fibres of component (C) may be in the form of short fibres, preferably in the form of chopped glass 0.2-20 mm in length, or in the form of continuous filament fibres. The moulding compositions thus contain 0 to 70 wt %, preferably 10 to 65 wt % and more preferably 20 to 60 wt % of a glass fibre (B1) used in the form of so-called short fibres (e.g. chopped glass 0.2-20 mm in length) or continuous filament fibres (rovings).

The glass fibres of component (C) according to the invention preferably have a circular or non-circular cross-sectional area.

Glass fibres having a circular cross section, i.e. round glass fibres, are typically 5-20 µm, preferably 6-17 µm and more preferably 6-13 µm in diameter. They are preferably employed in the form of short glass fibre (chopped glass having a length of 0.2 to 20 mm, preferably 2-12 mm).

The flat glass fibres of component (C), i.e. glass fibres having a non-circular cross-sectional area, are preferably those having a dimensional ratio of more than 2, preferably of 2 to 8, in particular of 2 to 5, between the principal cross-sectional axis and the perpendicular secondary cross-sectional axis thereon which are used. The cross-sectional area of these so-called flat glass fibres is oval, elliptical, elliptical with single or multiple necking (so-called cocoon fibre), polygonal, rectangular or nearly rectangular. A further characterizing feature of the flat glass fibres employed consists in the length of the principal cross-sectional axis preferably being in the range from 6 to 40 µm, in particular in the range from 15 to 30 µm, and the length of the secondary cross-sectional axis being in the range from 3 to 20 µm, in particular in the range from 4 to 10 µm. These flat glass fibres have a very high packing density, i.e. the extent to which the cross-sectional area of the glass fibres fills an imaginary rectangle surrounding the glass fibre cross section as precisely as possible is at least 70%, preferably at least 80% and more preferably at least 85%.

The moulding compositions of the present invention may also be reinforced by using mixtures of glass fibres of circular and non-circular cross section, wherein the proportion of flat glass fibres is preferably predominant, i.e. comprises more than 50 wt % of the entire mass of the fibres.

The glass fibres are preferably provided with a size suitable for the particular thermoplastic, in particular for polyamide, for example a size comprising a coupling agent based on an amino- or epoxysilane compound.

The high-strength glass fibres employed within component (C) as a roving in a further preferred embodiment are preferably from 8 to 20 µm, preferably from 12 to 18 µm, in diameter, while the cross section of the glass fibres may be round, oval, elliptical, elliptical with single or multiple necking, polygonal, rectangular or nearly rectangular. Particular preference is given to so-called flat glass fibres where the ratio of the cross-sectional axes is in the range from 2 to 5. These continuous filament fibres, which are with particular preference within component (C), are incorporated into the polyamide moulding compositions of the present invention by known processes for the production of elongate long-fibre-reinforced pellets/granulate (fibre length and pellet length are identical), in particular by pultrusion processes wherein the continuous filament fibre strand (roving) is fully saturated with the polymer melt and then cooled and chopped. The elongate long-fibre-reinforced pellets thus obtained, which preferably have a pellet length of 3 to 25 mm, in particular of 4 to 12 mm, are further processable by the usual processing methods (e.g. injection moulding, compression moulding) to form moulded parts. The moulding compositions of the present invention are also reinforcible by combining continuous filament fibres (long glass fibres) with chopped fibres (short glass fibres).

The particulate additives of component (C) comprise fillers familiar in this function to a person skilled in the art. They include specifically particulate fillers selected from the group consisting of: talc, mica, silicates, quartz, wollastonite, kaolin, silicas, magnesium carbonate, magnesium hydroxide, chalk, ground or precipitated calcium carbonate, lime, feldspar, inorganic pigments, for example barium sulphate, zinc oxide, zinc sulphide, lithopone and titanium dioxide (rutile, anatase), iron oxide, iron manganese oxide, metal oxides, in particular spinets, for example copper iron spinel, copper chromium oxide, zinc iron oxide, cobalt chromium oxide, cobalt aluminium oxide, magnesium aluminium oxide, copper chromium manganese mixed oxides, copper manganese iron mixed oxides, rutile pigments such as titanium zinc rutile, nickel antimony titanate, chromium antimony titanate, hard- or soft-magnetic metals or alloys/ceramics, hollow-sphere silicate fillers, alumina, boron nitride, boron carbide, aluminium nitride, calcium fluoride and mixtures thereof. The fillers may also have a surface treatment.

The particulate additives preferably have a median particle size (D50) in the range of 0.1-40 µm, preferably in the range of 0.2-20 µm, in particular in the range of 0.3-10 µm. Preference is given to a form of the particulate fillers where the aspect ratios L/b1 and L/b2 are both at most 10, in particular at most 5, the aspect ratios being described by the quotients formed by dividing the b1 or b2 average width of the particle into its largest length L, where b1 and b2 are perpendicular to each other in a plane perpendicular to the length L.

The particulate additives of component (C) further preferably have a non-zero absorption coefficient for UV, VIS or IR radiation, in particular for laser radiation, preferably at a wavelength in the region of 1064 nm, preferably with an absorption capability in the visible and/or infrared spectrum with an absorption coefficient of at least 0.05, preferably at least 0.1 and more preferably at least 0.2.

It is particularly preferred to use inorganic white pigments as particulate additives of component (C). It is especially preferable for component (C) to be formed exclusively of these white pigments. In this case, component (C) is or consists exclusively of the inorganic white pigments selected from the group barium sulphate, zinc oxide, zinc sulphide, lithopone and titanium dioxide (rutile, anatase), wherein the white pigments preferably have a median particle size (D50) in the range of 0.1-40 μm, preferably in the range of 0.1-20 μm, in particular in the range of 0.1-10 μm.

Component (D):

The polyamide moulding composition may include adding further polymers other than component (A), in particular impact modifiers other than (B), in an amount of 0 to 20 wt %, preferably in the range of 5-15 wt %, more preferably in the range of 5-10 wt %.

The non-(A) polymers (component D), which may likewise be present in the form of a mixture with the polyamide constituent (A), are preferably selected from the group consisting of: polycarbonate, polystyrene, polymethyl methacrylate, acrylonitrile-butadiene-styrene copolymer, acrylonitrile-styrene copolymer, polyolefin, polyoxymethylene, polyester, in particular polyethylene terephthalate, polybutylene terephthalate, polysulphone (in particular of the type PSU, PESU, PPSU), polyphenylene ether, polyphenylene sulphide, polyphenylene oxide, liquid-crystalline polymers, polyether ketone, polyether ether ketone, polyimide, aliphatic polyamides having a melting point below 270° C., amorphous polyamides having a glass transition temperature of 90 to 200° C. and a melting enthalpy of at most 4 J/g, polyamide imide, polyester imide, polyether amide, polyester amide, polyether ester amide, polyurethane (in particular of the type TPU, PUR), polysiloxane, polyacrylate, polymethacrylate and also mixtures or copolymers based on such systems. Preferred aliphatic polyamides within components (D) are PA 56, PA 66, PA 610, PA 612, PA 6/12, PA 12, PA 11, PA 1010, PA 1012 and PA 1212. Preferred amorphous polyamides within component (D) are PA 6I/6T, PA 10I/10T, PA 10I/10T/BACI/BACT (BAC=1,3-bis(aminomethyl)cyclohexane), PA MACMI/12 and PA MACM12. Particular preference is given to PA 6I/6T having an isophthalic acid content in the range from 50 to 100 mol % and particularly in the range from 60 to 80 mol %, the mol % each being based on the diacid portion, i.e. on the sum total of isophthalic acid and terephthalic acid. In a further embodiment, the moulding composition of the present invention contains as component (D) up to 20 wt %, based on the entire moulding composition of one or more impact modifiers (IMs) different from (B). The impact modifier may be a natural rubber, polybutadiene, polyisoprene, polyisobutylene, an interpolymer of butadiene and/or of isoprene with styrene or styrene derivatives and other comonomers, a hydrogenated interpolymer and/or an interpolymer formed by grafting or copolymerization with acid anhydrides, (meth)acrylic acid and/or esters thereof. The impact modifier (D) may also be a graft rubber having a crosslinked elastomeric core consisting of butadiene, isoprene or alkyl acrylates and having a graft sheath of polystyrene, or polar or apolar olefin homo- and copolymer such as ethylene-propylene rubber, ethylene-propylene-diene monomer rubber and ethylene-octene rubber, polar or apolar olefin homopolymer and copolymer formed by grafting or copolymerization with acid anhydrides, (meth)acrylic acid and esters thereof. The impact modifier (D) may also be a carboxyl-functionalized copolymer such as poly(ethene-co-(meth)acrylic acid) or poly(ethene-co-1-olefin-co-(meth)acrylic acid), wherein the 1-olefin may be an alkene or an unsaturated (meth)acrylic ester having more than 4 atoms, including such copolymers wherein the acid groups are partly neutralized with metal ions.

The examples of styrene-based block copolymers are styrene-(ethylene-butylene) diblock and styrene-(ethylene-butylene)-styrene triblock copolymers.

In a further preferred embodiment, the moulding compositions according to the present invention are characterized in that component (D) contains a polyolefin homopolymer or an ethylene-α-olefin copolymer, more preferably an EP and/or EPDM elastomer (ethylene-propylene rubber and/or ethylene-propylene-diene monomer rubber). For instance, it may be an elastomer based on an ethylene-C3-12-α-olefin copolymer with 20 to 96, preferably 25 to 85 wt % of ethylene, in which case it is particularly preferable for the C3-12-α-olefin to be an olefin selected from the group propene, 1-butene, 1-pentene, 1-hexene, 1-octene, 1-decene and/or 1-dodecene, and component (D) is with particular preference ethylene-propylene rubber and/or LLDPE and/or VLDPE.

Alternatively or additionally (in admixture, for example), (D) may contain a terpolymer based on ethylene-C3-12-α-olefin with an unconjugated diene, in which case this preferably contains 25 to 85 wt % of ethylene and maximally in the region of 10 wt % of an unconjugated diene, in which case the C3-12-α-olefin is more preferably an olefin selected from the group propene, 1-butene, 1-pentene, 1-hexene, 1-octene, 1-decene and/or 1-dodecene, and/or the unconjugated diene is preferably selected from the group bicyclo (2.2.1)heptadiene, 1,4-hexadiene, dicyclopentadiene and/or specifically 5-ethylidenenorbornene.

Ethylene-acrylate or ethylene-butylene-acrylate copolymers are additionally also useful as a constituent for component (D).

Component (D) preferably has constituents with carboxylic acid or carboxylic anhydride groups incorporated by thermal or free-radical reaction of the main chain polymer with an unsaturated dicarboxylic anhydride, an unsaturated dicarboxylic acid or an unsaturated monoalkyl dicarboxylate in a concentration sufficient for good attachment to the polyamide, the reagents used for this preferably being selected from the following group: maleic acid, maleic anhydride, monobutyl maleate, fumaric acid, aconitic acid and/or itaconic anhydride.

Preferably from 0.1 to 4.0 wt % of an unsaturated anhydride is grafted onto the impact component as constituent of (D) or the unsaturated dicarboxylic anhydride or its precursor is grafted together with a further unsaturated monomer. In general, the degree of grafting is preferably in the range of 0.1-1.0%, more preferably in the range of 0.3-0.7%. Another possible constituent of component (D) is a mixture of an ethylene-propylene copolymer and an ethylene-butylene copolymer, this with a degree of maleic anhydride (MA) grafting in the range of 0.3-0.7%. The above-specified possible systems for said component are also usable in mixtures.

The impact modifiers other than (B) which are employed as component (D) accordingly include homopolymers or copolymers of olefins, e.g. ethylene, propylene, 1-butene, or copolymers of olefins and copolymerizable monomers, such as vinyl acetate, (meth)acrylic esters and methylhexadiene.

Examples of crystalline olefin polymers are low, medium and high density polyethylenes, polypropylene, polybutadiene, poly-4-methylpentene, ethylene-propylene block or random copolymers, ethylene-methylhexadiene copolymers, propylene-methylhexadiene copolymers, ethylene-propylene-butene copolymers, ethylene-propylene-hexene copolymers, ethylene-propylene-methylhexadiene copolymers, poly(ethylene-ethyl acrylate) (EEA), ethylene-octene copolymer, ethylene-butene copolymer, ethylene-hexene copolymer, ethylene-propylene-diene terpolymers and also combinations thereof.

Examples of commercially available impact modifiers other than component (B) which are employable in the context of the constituents of component (D) are: TAFMER MC201: g-MAH (~0.6%) blend of 67% EP copolymer (20 mol % propylene)+33% EB copolymer (15 mol % 1-butene)); TAFMER MH5010: g-MAH (~0.6%) ethylene-butylene copolymer; TAFMER MH7010: g-MAH (0.7%) ethylene-butylene copolymer; Mitsui. TAFMER MH7020: g-MAH (0.7%) EP copolymer from Mitsui Chemicals; EXXELOR VA1801: g-MAH (0.7%) EP copolymer; EXXELOR VA1803: g-MAH (0.5-0.9%) EP copolymer, amorphous; EXXELOR VA1810: g-MAH (0.5%) EP copolymer; EXXELOR MDEX 94-11: g-MAH (0.7%) EPDM, Exxon Mobile Chemical; FUSABOND MN493D: g-MAH (0.5%) ethylene-octene copolymer; FUSABOND A EB560D (g-MAH) ethylene-n-butyl acrylate copolymer; ELVALOY, DuPont; Kraton FG1901GT: g-MAH (1.7%) SEBS with an S:EB ratio of 30:70; Lotader AX8840: ethylene-glycidyl methacrylate copolymer.

Preference is also given to an ionomer wherein metal ions link some or all of the polymer-attached carboxyl groups.

Particular preference is given to butadiene-styrene interpolymers functionalized by grafting with maleic anhydride, to polar or apolar olefin homo- and copolymers formed by grafting with maleic anhydride, and to carboxyl-functionalized copolymers such as poly(ethene-co-(meth)arylic acid) or poly(ethene-co-1-olefin-co-(meth)acrylic acid) wherein the acid groups are partly neutralized with metal ions.

Component (E):

The moulding composition in a further preferred embodiment further contains 8-20 wt %, preferably 9-18 wt % and more preferably 11-16 wt % of a flame retardant. The flame retardant is preferably halogen-free. The flame retardant in component (E) comprises with preference 60-100 wt %, preferably 70-98 wt % and more preferably 80-96 wt % of a phosphinic acid salt and/or of a diphosphinic acid salt (component (E1)) and also 0-40 wt %, preferably 2-30 wt % and more preferably 4-20 wt % of a nitrogen-containing synergist and/or of a nitrogen- and phosphorus-containing flame retardant (component (E2)). Component (E2) is preferably melamine or a condensation product of melamine, e.g. melem, melam, melon, or a reaction product of melamine with polyphosphoric acid or a reaction product of a condensation product of the melamine with polyphosphoric acid or a mixture thereof. Melamine polyphosphate in particular is preferred for use as component (E2). Flame retardants of this type are known from the prior art. DE 103 46 3261 is referenced in this regard.

Preference for use as component E1 is given to an aluminium, calcium, zinc or barium phosphinate and/or diphosphinate, wherein the hydrocarbon substituents on the phosphorus are preferably linear or branched alkyl moieties of 1 to 8 carbon atoms and/or aryl moieties of 6 to 15 carbon atoms.

Component (F):

The additives of component (F) are additives other than components (A), (B), (C), (D) and/or (E). In one preferred embodiment, the proportion of component (F) additives is in the range of 0-4 wt %.

The additives of component (F) are further preferably selected from the following group or a mixture thereof: adhesion promoters, crystallization accelerants or retarders, antioxidants, antiozonants, photoprotectants, heat stabilizers, for example phenols, phosphites, copper halides, cerium oxide hydrates, lanthanum salts, UV stabilizers, UV absorbers, UV blockers, lubricants, demoulding agents, plasticizers, processing aids, antistats, pigments, colouring and marking materials, nanoparticles in platelet form, conductivity additives, including carbon black, graphite powder or carbon nanofibrils, residuals from polymerization processes such as catalysts, salts and derivatives thereof, and also regulators such as monoacids or monoamines, and/or wherein it is oxygen-, nitrogen- or sulphur-containing metal compounds as stabilizers, wherein metals such as aluminium, calcium, barium, sodium, potassium, magnesium and/or zinc are preferable, and compounds are more preferably selected from the group of oxides, hydroxides, carbonates, silicates, borates, phosphates, stannates and also combinations or mixtures thereof, such as oxide-hydroxides or oxide-hydroxide-carbonates.

The present invention further provides a process for producing and/or processing or providing a polyamide moulding composition as set out above, characterized in that at least the components (A)-(B), optionally also one, two or more or all components (C)-(F) are initially charged and mixed at a melt temperature ($T_M$) of at least 290° C., preferably of at least 300° C. more preferably at least 310° C., preferably in an extrusion process. Preference is also given to employing a processing method, preferably an injection-moulding process, wherein a mixture of components (A)-(F) is employed and is mixed and/or processed at a melt temperature ($T_M$) of at least 290° C., preferably at least 300° C. and more preferably at least 310° C.

It is further preferable to mix at a melt temperature $T_M$ of at least 290° C., preferably at least 300° C. and more preferably at least 310° C. for a period of at least 10 seconds, preferably in the region of at least 20 seconds or 30 seconds, preferably in a screw extruder, particularly a single- or twin-screw extruder, a multi-screw extruder or an injection-moulding machine. The present invention further provides a component part produced from a polyamide moulding composition as set out above, said component part preferably being a housing or a load-bearing structural element, in particular for electrical and/or electronic applications or in the automotive sector, in particular connectors, loudspeakers, microphones, frame parts.

Last but not least the present invention additionally also provides for the use of ethylene-vinyl acetate copolymer to adjust the flowability of a thermoplastic polyamide selected from the following group: aliphatic polyamide, cycloaliphatic polyamide, partly aromatic polyamide, or a mixture thereof, particularly having a melting temperature ($T_m$) of at least 270° C. and a melting enthalpy ($\Delta Hm$) in the range of 30-70 J/g, each measured to ISO standard 11357-3 on the granulate at a heating rate of 20° C./min, wherein the ethylene-vinyl acetate copolymer is employed in a proportion in the range of 1-10 wt % based on the overall mass.

Preference is given to using an ethylene-vinyl acetate copolymer having a vinyl acetate content of 5-35%, preferably 8-25%, more preferably 10-20%, where the percentages are each based on the overall mass of ethylene-vinyl acetate copolymer including any graft present.

In a further preferred embodiment of the use, the ethylene-vinyl acetate copolymer is grafted preferably with a system selected from the following group: acrylic acid, methacrylic acid, maleic anhydride, wherein the ethylene-vinyl acetate copolymer preferably has a graft in the range of 0.5-5%, preferably in the range of 1-3%, wherein the percentages are each based on the overall mass of ethylene-vinyl acetate copolymer, including graft.

A particularly preferred embodiment is characterized in that component (A) comprises polyamide 6T/66 (having a ratio in the range of 50:50-67:33, preferably having a ratio in the range of 55:45, preferably having a melting point of 310° C., in a proportion of 39-69 weight percent and component (B) comprises acrylic acid-grafted EVA in a proportion of 1-6 weight percent, preferably combined with a 30-55 weight percent proportion of component (C) selected as glass fibres.

A further particularly preferred embodiment is characterized in that component (A) comprises polyamide 6T/6I (having a ratio in the range of 60:40-80:20, preferably having a ratio of 70:30), in a proportion of 39-69 weight percent and component (B) comprises acrylic acid-grafted EVA in a proportion of 1-6 weight percent, preferably combined with a 30-55 weight percent proportion of component (C) selected as glass fibres.

A further particularly preferred embodiment is characterized in that component (A) comprises polyamide 10T/6T (having a ratio in the range of 70:30-90:10, preferably having a ratio of 85:15), in a proportion of 39-69 weight percent and component (B) comprises acrylic acid-grafted EVA in a proportion of 1-6 weight percent, preferably combined with a 30-55 weight percent proportion of component (C) selected as glass fibres.

Further embodiments are specified in the dependent claims.

DESCRIPTION OF PREFERRED EMBODIMENTS

Preferred embodiments of the invention are hereinbelow described by means of working examples which are merely for elucidation and must not be construed as limiting.

Examples B1 to B13 and Comparative Examples VB1 to VB6

The components specified in tables 3 to 5 are compounded in a Werner & Pfleiderer twin-screw extruder having a screw diameter of 25 mm at predetermined processing parameters (see table 1), for which the polyamide pellets and also the additives are metered into the feed zone, while the glass fibre is metered into the polymer melt through a sidefeeder at a point 3 barrel units upstream of the die. The compounds summarized in tables 3, 4 and 5 were extruded from a 2.5 mm diameter die, cooled with water and pelletized. The pellet material is dried at 110° C. in a 30 mbar vacuum for 24 hours.

TABLE 1

Compounding process parameters

| Parameter [unit] | B1, B2, B6, VB1, VB2, VB4 | B3-B5, B7, VB3, VB5 | B9, VB9 |
|---|---|---|---|
| Zone 1 temperature [° C.] | 80-100 | 80-100 | 80-100 |
| Zone 2 temperature [° C.] | 280 | 290 | 280 |
| Zone 3 to 10 temperature [° C.] | 320-330 | 330-340 | 320-330 |
| Zone 11 temperature [° C.] | 310-320 | 320-330 | 310-320 |

TABLE 1-continued

Compounding process parameters

| Parameter [unit] | B1, B2, B6, VB1, VB2, VB4 | B3-B5, B7, VB3, VB5 | B9, VB9 |
|---|---|---|---|
| Zone 12 temperature [° C.] | 310 | 320 | 310 |
| Die head temperature [° C.] | 310 | 320 | 310 |
| Throughput [kg/h] | 10 | 10 | 10 |
| Screw speed [rpm] | 180 | 180 | 180 |

The compounds are processed in an Arburg Allrounder 320-210-750 injection-moulding machine into test specimens at defined barrel temperatures for zones 1 to 4 and a defined mould temperature (see table 2).

TABLE 2

Melt and mould temperature in injection-moulding process

| Example | Mould temperature for other test specimens [° C.] | Mould temperature for flow spirals [° C.] | Melt temperature for all test specimens [° C.] |
|---|---|---|---|
| B1, B2, B6, VB1, VB2, VB4 | 100 | 40 | 300 |
| B3-B5, B7, VB3, VB5 | 130 | 40 | 330 |
| B9, VB9 | 120 | 40 | 320 |

Legend:
PA-1 polyamide 6T/66 having a 55:45 molar ratio of terephthalic acid to adipic acid and a melting point Tm of 310° C. $\eta_{rel}$=1.68, ΔHm=62 J/g
PA-2 polyamide 6T/6I having a 70:30 molar ratio of terephthalic acid to isophthalic acid; partly crystalline polyamide based on TPS, IPS and HMDA, Tm=325° C., $\eta_{rel}$=1.58, ΔHm=55 J/g.
PA-4 polyamide 6T/6I having a 70:30 molar ratio of terephthalic acid to isophthalic acid, oligomer with Mn of 1000 g/mol.
PA-5 polyamide 10T/6T having an 85:15 molar ratio of decanediamine to hexanediamine; partly crystalline polyamide with Tm=298° C., $\eta_{rel}$=1.65, ΔHm=64 J/g
EVA-1 unsaponified ethylene-vinyl acetate copolymer grafted with 2 wt % of acrylic acid, Scona TPEV 1110 PB, vinyl acetate content: 14 wt %.
IM-1 Lotader AX 8840 (ethylene-co-GMA)
Glass fibre Vetrotex 995 EC 10-4.5, glass fibre having a round cross-sectional area 10 μm in diameter and 4.5 mm in average length.
Stabilizer-1 Hostanox PAR24/Irganox 1098 (1:1)
Stabilizer-2 copper iodide/potassium iodide
Additive-1 kaolin
Additive-2 Alugel 34-TH
FR-1 halogen-free flame retardant, Exolit OP1230, Clariant
FR-2 halogen-free flame retardant, Melapur 200, BASF

TABLE 3

| Components | Unit | B1 | B2 | B3 | B4 | B5 | B6 | B7 | VB1 | VB2 |
|---|---|---|---|---|---|---|---|---|---|---|
| PA-1 | wt % | 65.37 | 63.37 | | | | 61.37 | | 69.37 | 65.37 |
| PA-2 | wt % | | | 58.62 | 56.62 | 53.62 | | 50.62 | | |
| PA-4 | wt % | | | | | | | | | 4 |
| PA-5 | wt % | | | | | | | | | |
| EVA-1 | wt % | 4 | 6 | 1 | 3 | 6 | 4 | 3 | | |
| IM-1 | wt % | | | | | | 4 | 6 | | |

TABLE 3-continued

| Component | Unit | | | | | | | | | |
|---|---|---|---|---|---|---|---|---|---|---|
| Glass fibre | wt % | 30 | 30 | 40 | 40 | 40 | 30 | 40 | 30 | 30 |
| Stabilizer-1 | wt % | 0.63 | 0.63 | | | | 0.63 | | 0.63 | 0.63 |
| Stabilizer-2 | wt % | | | 0.18 | 0.18 | 0.18 | | 0.18 | | |
| Additive-1 | wt % | | | 0.2 | 0.2 | 0.2 | | 0.2 | | |
| Additive-2 | wt % | | | | | | | | | |
| FR-1 | wt % | | | | | | | | | |
| FR-2 | wt % | | | | | | | | | |
| Melt temperature $T_M$ (extrusion) | ° C. | 312 | 314 | 328 | 326 | 325 | 311 | 326 | 314 | 311 |
| MVR (330° C./10 kg) | cm³/10 min | 260 | 366 | 98 | 175 | 470 | 164 | 88 | 64 | 156 |
| MVR (330° C./5 kg) | cm³/10 min | | | | | | | | | |
| Tensile modulus of elasticity | MPa | 9420 | 9290 | 13750 | 13420 | 13040 | 8540 | 11780 | 8530 | 9300 |
| Breaking strength | MPa | 162 | 161 | 234 | 227 | 210 | 149 | 201 | 148 | 136 |
| Breaking extension | % | 2.8 | 2.7 | 2.3 | 2.3 | 2.2 | 2.8 | 2.7 | 3.1 | 1.8 |
| Impact toughness 23° C. | kJ/m² | 54 | 60 | 75 | 76 | 68 | 69 | 90 | 38 | 28 |
| Notched impact toughness 23° C. | kJ/m² | 7 | 7 | 10 | 10 | 10 | 9 | 13 | 5.4 | 4.4 |
| HDT A (1.8 Mpa) | ° C. | 276 | 280 | | | | 276 | | 227 | 249 |
| HDT C (8 MPa) | ° C. | 140 | 150 | | | | 126 | | 96 | 106 |
| Flow length (spiral 1.5 × 10 mm) | mm | | | 199 | 245 | 320 | | 218 | | |
| Flow length (spiral 0.5 × 10 mm) | mm | 88 | 109 | 53 | 66 | 92 | 78 | 51 | 49 | 57 |

| Components | Unit | VB3 | VB4 | VB5 | B9 | VB9 |
|---|---|---|---|---|---|---|
| PA-1 | wt % | | 65.37 | | | |
| PA-2 | wt % | 59.62 | | 53.62 | | |
| PA-4 | wt % | | | | | |
| PA-5 | wt % | | | | 52.7 | 56.7 |
| EVA-1 | wt % | | | | 4 | |
| IM-1 | wt % | | 4 | 6 | | |
| Glass fibre | wt % | 40 | 30 | 40 | 30 | 30 |
| Stabilizer-1 | wt % | | 0.63 | | 0.5 | 0.5 |
| Stabilizer-2 | wt % | 0.18 | | 0.18 | | |
| Additive-1 | wt % | 0.2 | | 0.2 | | |
| Additive-2 | wt % | | | | 0.3 | 0.3 |
| FR-1 | wt % | | | | 12 | 12 |
| FR-2 | wt % | | | | 0.5 | 0.5 |
| Melt temperature $T_M$ (extrusion) | ° C. | 325 | 312 | 327 | 318 | 319 |
| MVR (330° C./10 kg) | cm³/10 min | 62 | 23 | 43 | | |
| MVR (330° C./5 kg) | cm³/10 min | | | | | |
| MVR (275° C./5 kg) | cm³/10 min | | | | 122 | 46 |
| Tensile modulus of elasticity | MPa | 13800 | 8700 | 12040 | 10100 | 10200 |
| Breaking strength | MPa | 237 | 150 | 205 | 131 | 140 |
| Breaking extension | % | 2.3 | 2.7 | 2.8 | 2.2 | 2.2 |
| Impact toughness 23° C. | kJ/m² | 69 | 65 | 60 | 45 | 54 |
| Notched impact toughness 23° C. | kJ/m² | 10 | 9 | 14 | 8 | 7 |
| HDT A (1.8 Mpa) | ° C. | | | 260 | | |
| HDT C (8 MPa) | ° C. | | | 146 | | |
| Flow length (spiral 1.5 × 10 mm) | mm | 179 | | 162 | | |
| Flow length (spiral 0.5 × 10 mm) | mm | 45 | 42 | 38 | 64 | 56 |

The measurements were carried out according to the following standards and on the following test specimens:

The thermal behaviour (melting point (TM), melting enthalpy (ΔHm), glass transition temperature (Tg)) was determined on the pellet to ISO standard 11357-1/-2/-3. Differential scanning calorimetry (DSC) was performed at a heating rate of 20° C./min.

The relative viscosity ($\eta_{rel}$) was determined to DIN EN ISO 307 on solutions of 0.5 g of polymer dissolved in 100 ml of m-cresol at a temperature of 20° C.

Tensile modulus of elasticity, breaking strength and breaking extension:

Measurement at an extension rate of 50 mm/min (unreinforced variants) or at an extension rate of 5 mm/min (reinforced variants).

ISO tensile bar, standard: ISO/CD 3167, type A1, 170× 20/10×4 mm, temperature 23° C.

Tensile modulus of elasticity, breaking strength and breaking extension were determined to ISO 527 at an extension rate of 1 mm/min (tensile modulus of elasticity), and/or at an extension rate of 50 mm/min (unreinforced variants) or at an extension rate of 5 mm/min (reinforced variants; breaking strength, breaking extension) on the ISO tensile bar, standard: ISO/CD 3167, type A1, 170×20/10×4 mm at a temperature of 23° C.

Impact strength and notched impact strength after Charpy were measured to ISO 179/keU on the ISO test bar, standard: ISO/CD 3167, type B1, 80×10×4 mm at a temperature of 23° C.

The heat distortion temperature HDT A (1.8 MPa), HDT B (0.45 MPa) and HDT C (8 MPa) was determined to DIN EN ISO 75-1,-2 (precursor: DIN 53461) on the ISO impact bar measuring 80×10×4 mm.

The MVR (Melt Volume Rate) was determined to ISO 1133 at different temperatures and loads, as reported in Table 3.

The flow test is used to compare the flowability of thermoplastics in injection moulding. The test was carried out using two different spiral shapes having a cross section of 10×1.5 mm and 10×0.5 mm, respectively. The flow distance can be read off the moulded parts on the engraved scale.

The flow lengths [mm] were determined using a Krauss-Maffei 50-55 C2 (screw cylinder diameter: 20 mm) Flow spirals were fabricated in the dimensions 0.5 mm×10 mm (hold pressure: 1500 bar: cooling time: 15 s) and 1.5 mm×10 mm (hold pressure: 1000 bar: cooling time: 20 s) at the melt and mould temperatures reported in Table 2. The hold pressure time is 5 seconds for both types of flow spirals, the screw speed is 100 rpm.

The melt temperature $T_M$ (extrusion) is determined on the melt emerging from the die of the extruder, using a portable TESTO temperature-measuring device fitted with a thermometer probe (thermocouple) by dipping the tip of the thermometer into the melt until a constant temperature value can be read off on the display.

Discussion of Table Results:

As the results in table 3 show, the use of EVA in the moulding compositions of the present invention has the effect of increasing the MVR and the flow length. A 4% EVA inclusion in the moulding composition of VB1 increases the MVR from 64 to 266 cm³/10 min and the flow length from 49 to 88 mm MVR and flow length are observed to increase to a relatively large extent with increasing EVA concentration. To wit, 6% EVA in Example B2 gives an MVR of 366 cm³/10 min and a flow length of 109 mm. For comparative purposes, an oligomer was used in VB2 at 4% concentration to improve the flow properties. While the MVR and flow length values are improved by the oligomer versus VB1, they are distinctly lower than on using EVA, i.e. EVA works very efficiently as regards flow improvement. The comparison of Examples B3 to B5 with VB3 reveals that an increase in EVA concentration leads to rapidly rising MVR values and flow lengths.

The use of an impact modifier is likewise capable of influencing the flow behaviour of the moulding compositions. The reactive impact modifier used in VB4 and VB5 reduces the MVR and the flow length of the moulding compositions to a significant extent, as becomes evident on comparison with VB1 and VB3. Nonetheless, the flow behaviour is distinctly improved by the use of EVA, as Examples B6 and B7 demonstrate. Even the apparently difficult-to-process flame-retarded moulding compositions are significantly improved in flow behaviour by EVA, as a comparison of B9 with VB9 reveals.

The invention claimed is:

1. A polyamide moulding composition consisting of the following components:
   (A) 29-89 wt % of at least one partly crystalline thermoplastic homo- or copolyamide selected from the group consisting of: aliphatic polyamide, cycloaliphatic polyamide, partly aromatic polyamide, and a mixture thereof, in each case having a melting temperature ($T_m$) of at least 270° C. and a melting enthalpy (ΔHm) in the range of 30-70 J/g, each measured to ISO standard 11357-3 on the granulate at a heating rate of 20° C./min;
   (B) 1-10 wt % of ethylene-vinyl acetate copolymer;
   (C) 10-70 wt % of filling and reinforcing materials selected from the group consisting of: fibrous reinforcing materials, particulate fillers and mixtures thereof;
   (D) 0-20 wt % of impact modifier other than (B), polymers other than (A), and mixtures thereof;
   (E) 0-20 wt % of flame retardant; and
   (F) 0-5 wt % of additives different from (B)-(E),
   wherein the sum total of components (A)-(F) is 100 weight percent, and
   wherein the ethylene-vinyl acetate copolymer of component (B) is uncrosslinked and the polyamide moulding composition is free from cross-linkers and free-radical formers.

2. The polyamide moulding composition according to claim 1, wherein the ethylene-vinyl acetate copolymer of component (B) is grafted, with a system selected from the following group: acrylic acid, methacrylic acid, maleic acid, maleic anhydride, monobutyl maleate, fumaric acid, aconitic acid, glycidyl acrylate, glycidyl methacrylate and/or itaconic anhydride, or combinations thereof.

3. The polyamide moulding composition according to claim 1, wherein component (A) is an aliphatic or partly aromatic, partly crystalline polyamide having a melting enthalpy (ΔHm) in the range of 40-65 J/g, or with a melting temperature ($T_m$) in the range of 280° C.-340° C., each measured to ISO standard 11357-3 on the granulate at a heating rate of 20° C./min, or a mixture of such polyamides.

4. The polyamide moulding composition according to claim 1, wherein said component (A) consists essentially or entirely of a partly aromatic, partly crystalline polyamide having a melting temperature ($T_m$) measured to ISO standard 11357-3 on the granulate at a heating rate of 20° C./min, of at least 290° C., constructed from:
   (A1) 25-100 mol % of terephthalic acid, based on the overall content of acids present,
   0-75 mol %, based on the overall content of acids present, of at least one dicarboxylic acid selected from the group consisting of: aromatic dicarboxylic acid of 8 to 20 carbon atoms other than terephthalic acid, aliphatic dicarboxylic acid of 6 to 36 carbon atoms, cycloaliphatic dicarboxylic acid of 8 to 20 carbon atoms, and a mixture thereof,
   (A2) 25-100 mol %, based on the overall content of diamines present, of at least one aliphatic diamine having 4 to 36 carbon atoms,
   0-75 mol %, based on the overall content of diamines present, of at least one diamine selected from the group: cycloaliphatic diamine of 6 to 20 carbon atoms, araliphatic diamine of 8-20 carbon atoms,
   wherein the percentage molar content of dicarboxylic acids is 100% and the percentage molar content of diamines is 100%,
   and also from:
   (A3) 0-100 mol % of amino carboxylic acids and/or lactams of 6 to 12 carbon atoms,
   with the proviso that the concentration of (A3) is at most 40 wt % based on the sum total of (A1) to (A3).

5. The polyamide moulding composition according to claim 4, wherein the component A1 dicarboxylic acid other than terephthalic acid is selected from the group consisting of: naphthalenedicarboxylic acid, isophthalic acid, adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, dimer acid, cis- and/or trans-cyclohexane-1,4-dicarboxylic acid, cis- and/or trans-cyclohexane-1,3-dicarboxylic acid, and mixtures thereof,
   and/or wherein the aliphatic diamine of component A2 is selected from the group consisting of: 1,4-butanediamine, 1,5-pentanediamine, 1,6-hexanediamine, 2-methyl-1,5-pentanediamine, 1,7-heptanediamine, 1,8-octanediamine, 1,9-nonanediamine, 2-methyl-1,8-octanediamine, 2,2,4-trimethylhexamethylenediamine, 2,4,4-trimethylhexamethylenediamine, 5-methyl-1,9-nonanediamine, 1,10-decanediamine, 1,11-undecanediamine, 2-butyl-2-ethyl-1,5-pentanediamine, 1,12-dodecanediamine, 1,13-tridecanediamine, 1,14-tetradecanediamine, 1,16-hexadecanediamine, 1,18-octadecanediamine or a mixture thereof,
   and/or wherein the cycloaliphatic or araliphatic diamine of component A2 is selected from the group consisting of: cyclohexanediamine, 1,3-bis(aminomethyl)cyclohexane, isophoronediamine, norbornanedimethylamine, 4,4'-diaminodicyclohexylmethane, 2,2-(4,4'-diaminodicyclohexyl)propane, bis(4-amino-3- ethylcyclohexyl)methane, bis(4-amino-3,5-dimethylcyclohexyl)methane and 3,3'-dimethyl-4,4'-diaminodicyclohexylmethane, m-xylylenediamine and p-xylylenediamine, and mixtures thereof, and/or wherein component A3 is selected from the group consisting of: caprolactam, α,ω-aminocaproic acid, α,ω-aminononanoic acid, α,ω-aminoundecanoic acid, laurolactam, α,ω-aminododecanoic acid, α,ω-amino acids having 4, 6, 7, 8, 11 or 12 carbon atoms, including 2-pyrrolidinone, ε-caprolactam, enantholactam, capryllactam, laurolactam, 1,4-aminobutanoic acid, 1,6-aminohexanoic acid, 1,7-aminoheptanoic acid, 1,8-aminooctanoic acid, 1,11-aminoundecanoic acid and 1,12-aminododecanoic acid, and mixtures thereof.

6. The polyamide moulding composition according to claim 4, wherein the proportion of terephthalic acid in component A1 is at least 50 mol %.

7. The polyamide moulding composition according to claim 4, wherein the proportion of terephthalic acid in component A1 is at least 50 mol %, and wherein the aliphatic diamine hexamethylenediamine comprises a proportion of at least 10 mol % within component A2, and wherein the remaining proportion of diamine is selected from the group consisting of: nonanediamine, methyloctanediamine, decanediamine, dodecanediamine, trimethylhexamethylenediamine, m-xylylenediamine, bis(4-aminocyclohexyl)methane, bis(4-amino-3-methylcyclohexyl)methane, and a mixture thereof, wherein the proportion of terephthalic acid in component A1 is at least 50 mol %, and wherein component A2 is a mixture of hexamethylenediamine and decanediamine employing at least 10 mol % of hexamethylenediamine, based on the overall diamine content;

in that wherein the proportion of terephthalic acid in component A1 is at least 80 mol %, and wherein component A2 consists of 10-60 mol % of hexamethylenediamine and 40-90 mol % of decanediamine.

8. The polyamide moulding composition according to claim 4, wherein component A contains or is formed by a partly crystalline polyamide 6T/6I having 50 to 80 mol % of hexamethyleneterephthalamide units and 20 to 50 mol % of hexamethyleneisophthalamide units, wherein component A is formed by a partly crystalline polyamide 6T/66 having 50 to 80 mol % of hexamethyleneterephthalamide units and 20 to 50 mol % of hexamethyleneadipamide units, wherein component A is formed by a partly crystalline ternary polyamide;

or 6T/6I/X having at least 50 mol % of hexamethyleneterephthalamide units, 0 to 40 mol % of hexamethyleneisophthalamide units and 10 to 50 mol % of aliphatic units of the formula NH—$(CH_2)_{n-1}$—CO—, where n=6, 11 or 12;

or 6T/6I/X having at least 50 mol % of hexamethyleneterephthalamide units, 10 to 30 mol % of hexamethyleneisophthalamide units and 10 to 40 mol % of aliphatic units of the formula —NH—$(CH_2)_{n-1}$—CO—, where n is equal to 6, 11 or 12;

or 6T/6I/X having 52 to 73 mol % of hexamethyleneterephthalamide units, 0 to 36 mol % of hexamethyleneisophthalamide units and 12 to 48 mol % of aliphatic units of the formula —NH—$(CH_2)_{n-1}$—CO—, where n is equal to 6, 11 or 12;

or 6T/6I/X having 52 to 73 mol % of hexamethyleneterephthalamide units, 10 to 36 mol % of hexamethyleneisophthalamide units and 12 to 38 mol % of aliphatic units of the formula —NH—$(CH_2)_{n-1}$—CO—, where n is equal to 6, 11 or 12.

9. The polyamide moulding composition according to claim 1, wherein said component (A) includes an aliphatic polyamide or is formed by an aliphatic polyamide, wherein the aliphatic polyamide is selected from the group consisting of: polyamide 46, polyamide 46/66, polyamide 46/56 and mixtures thereof.

10. The polyamide moulding composition according to claim 1, wherein said component (C) is present in a proportion of 15-65 wt %, and/or wherein the fibrous reinforcing materials in component (C) are selected from the group consisting of: glass fibres, basalt fibres, titanate whiskers, carbon fibres, graphite fibres, aramid fibres, nanotubes, and mixtures or surface-treated forms thereof, each of circular or non-circular cross-sectional area, and/or wherein the particulate fillers in component (C) are selected from the group consisting of: titanium dioxide, zinc sulphide, barium sulphate, barium titanate, talc, mica, silicates, quartz, glass spheres, glass flakes, wollastonite, kaolin, silicas, magnesium carbonate, magnesium hydroxide, chalk, ground or precipitated calcium carbonate, lime, feldspar, metal powder including iron powder, inorganic pigments, including iron oxide, iron manganese oxide, metal oxides, including spinels, including copper iron spinel, copper chromium oxide, copper chromite ($CuCr_2O_4$), zinc iron oxide, cobalt chromium oxide, cobalt aluminium oxide, magnesium aluminium oxide, copper chromium manganese mixed oxides, copper manganese iron mixed oxides, nickel antimony titanate, chromium antimony titanate, hard- or soft-magnetic metals or alloys/ceramics, hollow-sphere silicate fillers, alumina, boron nitride, boron carbide, aluminium nitride, calcium fluoride and mixtures or surface-treated forms thereof.

11. The polyamide moulding composition according to claim 1, wherein the proportion of component (D) is in the range of 5-15 wt %, and/or wherein said component (D) when selected as polymers other than (A) is selected from the group consisting of: polycarbonate, polystyrene, polymethyl methacrylate, acrylonitrile-butadiene-styrene copolymer, acrylonitrile-styrene copolymer, polyolefin, polyoxymethylene, polyester, including polyethylene terephthalate, polybutylene terephthalate, polysulphone, polyphenylene ether, polyphenylene sulphide, polyphenylene oxide, liquid-crystalline polymers, polyether ketone, polyether ether ketone, polyimide, aliphatic polyamides having a melting point below 270° C., amorphous polyamides having a glass transition temperature of 90 to 200° C. and a melting enthalpy of at most 4 J/g, polyamide imide, polyester imide, polyether amide, polyester amide, polyether ester amide, polyurethane, polysiloxane, polyacrylate, polymethacrylate and mixtures or copolymers based on such systems, and/or wherein said component (D) when selected as impact modifiers other than (B) is selected from the group consisting of: natural rubber, polybutadiene, polyisoprene, polyisobutylene, interpolymer of butadiene and/or of isoprene with styrene or styrene derivatives and other comonomers, hydrogenated interpolymer, interpolymer formed by grafting or copolymerization with acid anhydrides, (meth)acrylic acid and esters thereof, graft rubber having a cross-linked elastomeric core consisting of butadiene, isoprene or alkyl acrylates and having a graft sheath of polystyrene, polar or apolar olefin homo- and copolymer including ethylene-propylene rubber, ethylene-propylene-diene monomer rubber and ethylene-octene rubber, polar or apolar olefin homopolymer and copolymer formed by grafting or copolymerization with acid anhydrides, (meth)acrylic acid and esters thereof, carboxyl-functionalized copolymer including poly(ethene-co-(meth)acrylic acid) or poly(ethene-co-1-olefin-co-(meth)acrylic acid) and mixtures or copolymers based on such systems.

12. The polyamide moulding composition according to claim 1, wherein the proportion of flame retardant in component (E) is in the range of 0-20 wt %, and/or wherein the proportion of additives of component (F) is in the range of 0-4 wt %, and/or wherein the additives of component (F) are selected from the group consisting of: adhesion promoters, crystallization accelerants or retarders, antioxidants, antiozonants, photoprotectants, heat stabilizers, including phenols, phosphites, copper halides, cerium oxide hydrates, lanthanum salts, UV stabilizers, UV absorbers, UV blockers, flow assistants, lubricants, demoulding agents, plasticizers, stabilizers, processing aids, antistats, pigments, colouring and marking materials, nanoparticles in platelet form, conductivity additives, including carbon black, graphite powder or carbon nanofibrils, residuals from polymerization processes including catalysts, salts and derivatives thereof, and also regulators including monoacids or monoamines, and/or wherein it is oxygen-, nitrogen- or sulphur-containing metal compounds as stabilizers, wherein metals including aluminium, calcium, barium, sodium, potassium, magnesium or zinc and mixtures thereof.

13. A process for producing, providing or processing a polyamide moulding composition according to claim 1, wherein at least the components (A)-(B), optionally in addition also one, two or more or all components (C)-(F) are initially charged and mixed at a temperature of at least 290° C.

14. A component part produced from a polyamide moulding composition according to claim 1.

15. The polyamide moulding composition according to claim 1, wherein the proportion of component (B) is in the range of 2-6 wt %, or wherein said component (B) is an ethylene-vinyl acetate copolymer having a vinyl acetate content of 10-20%, wherein the percentages are each based on the overall mass of ethylene-vinyl acetate copolymer, including any graft present, and wherein the ethylene-vinyl acetate copolymer has a molar mass in the range of 30 000-300 000 g/mol.

16. The polyamide moulding composition according to claim 1, wherein the ethylene-vinyl acetate copolymer of component (B) is grafted, with a system selected from the following group: acrylic acid, methacrylic acid, maleic acid, maleic anhydride, monobutyl maleate, fumaric acid, aconitic acid, glycidyl acrylate, glycidyl methacrylate and/or itaconic anhydride, or combinations thereof, wherein the ethylene-vinyl acetate copolymer has a graft in the range of 0.2-4%, wherein the percentages are each based on the overall mass of ethylene-vinyl acetate copolymer, including graft.

17. The polyamide moulding composition according to claim 1, wherein component (A) is an aliphatic or partly aromatic, partly crystalline polyamide having a melting enthalpy ($\Delta H_m$) in the range of 40-65 J/g, or with a melting temperature ($T_m$) in the range of 290° C.-330° C., each measured to ISO standard 11357-3 on the granulate at a heating rate of 20° C./min, or a mixture of such polyamides.

18. The polyamide moulding composition according to claim 1, wherein said component (A) consists essentially or entirely completely of a partly aromatic, partly crystalline polyamide having a melting temperature ($T_m$) measured to ISO standard 11357-3 on the granulate at a heating rate of 20° C./min, of at least 290° C., constructed from:

(A1) 25-100 mol % of terephthalic acid, based on the overall content of acids present, 0-75 mol %, based on the overall content of acids present, of at least one dicarboxylic acid selected from the group: aromatic dicarboxylic acid of 8 to 20 carbon atoms other than terephthalic acid, aliphatic dicarboxylic acid of 6 to 36 carbon atoms, cycloaliphatic dicarboxylic acid of 8 to 20 carbon atoms, or a mixture thereof, (A2) 25-100 mol %, based on the overall content of diamines present, of at least one aliphatic diamine having 4 to 36 carbon atoms, 0-75 mol %, based on the overall content of diamines present, of at least one diamine selected from the group: cycloaliphatic diamine of 6 to 20 carbon atoms, araliphatic diamine of 8-20 carbon atoms, wherein the percentage molar content of dicarboxylic acids is 100% and the percentage molar content of diamines is 100%, and also from:

(A3) 0-100 mol % of amino carboxylic acids and/or lactams of 6 to 12 carbon atoms, with the proviso that the concentration of (A3) is at most at most 20 wt % based on the sum total of (A1) to (A3).

19. The polyamide moulding composition according to claim 4, wherein the component A1 dicarboxylic acid other than terephthalic acid is selected from the group: naphthalenedicarboxylic acid, isophthalic acid, adipic acid, suberic acid, azelaic acid, sebacic acid, undecanedioic acid, dodecanedioic acid, brassylic acid, tetradecanedioic acid, pentadecanedioic acid, hexadecanedioic acid, octadecanedioic acid, dimer acid, cis- and/or trans-cyclohexane-1,4-dicarboxylic acid, cis- and/or trans-cyclohexane-1,3-dicarboxylic acid, and mixtures thereof, or wherein the aliphatic diamine of component A2 is selected from the group: 1,6-hexanediamine and 1,10-decanediamine, and mixtures thereof, or wherein the cycloaliphatic or araliphatic diamine of component A2 is selected from the group: cyclohexanediamine, 1,3-bis(aminomethyl)cyclohexane, isophoronediamine, norbornanedimethylamine, 4,4'-diaminodicyclohexylmethane, 2,2-(4,4'-diaminodicyclohexyl)propane, bis(4-amino-3-ethylcyclohexyl)methane, bis(4-amino-3,5-dimethylcyclohexyl)methane and 3,3'-dimethyl-4,4'-diaminodicyclohexylmethane, m-xylylenediamine, p-xylylenediamine, and mixtures thereof, or wherein component A3 is selected from the group: caprolactam, α,ω-aminocaproic acid, α,ω-aminononanoic acid, α,ω-aminoundecanoic acid, laurolactam, α,ω-aminododecanoic acid, 2-pyrrolidinone, ε-caprolactam, enantholactam, capryllactam, laurolactam, 1,4-aminobutanoic acid, 1,6-aminohexanoic acid, 1,7-aminoheptanoic acid, 1,8-aminooctanoic acid, 1,11-aminoundecanoic acid and 1,12-aminododecanoic acid, and mixtures thereof.

20. The polyamide moulding composition according to claim 4, wherein the proportion of terephthalic acid in component A1 is at least 62 mol %, and wherein component A2 consists exclusively of hexamethylenediamine or exclusively of 2-methyl-1,5-pentanediamine or exclusively of a mixture of hexamethylenediamine and 2-methyl-1,5-pentanediamine.

21. The polyamide moulding composition according to claim 4, wherein the proportion of terephthalic acid in component A1 is at least 50 mol %, and wherein the aliphatic diamine hexamethylenediamine comprises a proportion of at least 50 mol %, within component A2, and wherein the remaining proportion of diamine is selected from the group: nonanediamine, methyloctanediamine, decanediamine, dodecanediamine, trimethylhexamethylenediamine, m-xylylenediamine, bis(4-aminocyclohexyl)methane, bis(4-amino-3-methylcyclohexyl)methane, or a mixture thereof,
wherein the proportion of terephthalic acid in component A1 is at least 50 mol %, and wherein component A2 is a mixture of hexamethylenediamine and decanediamine employing at least 50 mol % of hexamethylenediamine, based on the overall diamine content;
wherein the proportion of terephthalic acid in component A1 is 100 mol %, and wherein component A2 consists of 10-60 mol % of hexamethylenediamine and 40-90 mol % of decanediamine.

22. The polyamide moulding composition according to claim 4, wherein component A contains or is formed by a partly crystalline polyamide 6T/6I having 62 to 73 mol % of hexamethyleneterephthalamide units and 25 to 38 mol % of hexamethyleneisophthalamide units,
or wherein component A is formed by a partly crystalline polyamide 6T/66 having 52 to 62 mol % of hexamethyleneterephthalamide units and 38 to 48 mol % of hexamethyleneadipamide,
or wherein component A is formed by a partly crystalline ternary polyamide, 6T/6I/66 having 50 to 70 mol % of hexamethyleneterephthalamide units, 5 to 45 mol % of hexamethyleneisophthalamide units and 5 to 45 mol % of hexamethyleneadipamide units;
or 6T/6I/X having at least 50 mol % of hexamethyleneterephthalamide units, 0 to 40 mol % of hexamethyleneisophthalamide units and 10 to 50 mol % of aliphatic units of the formula NH—$(CH_2)_{n-1}$—CO—, where n=6, 11 or 12;
or 6T/6I/X having at least 50 mol % of hexamethyleneterephthalamide units, 10 to 30 mol % of hexamethyleneisophthalamide units and 10 to 40 mol % of aliphatic units of the formula —NH—$(CH_2)_{n-1}$—CO—, where n is equal to 6, 11 or 12;
or 6T/6I/X having 52 to 73 mol % of hexamethyleneterephthalamide units, 0 to 36 mol % of hexamethyleneisophthalamide units and 12 to 48 mol % of aliphatic units of the formula —NH—$(CH_2)_{n-1}$—CO—, where n is equal to 6, 11 or 12;
or 6T/6I/X having 52 to 73 mol % of hexamethyleneterephthalamide units, 10 to 36 mol % of hexamethyleneisophthalamide units and 12 to 38 mol % of aliphatic units of the formula —NH—$(CH_2)_{n-1}$—CO—, where n is equal to 6, 11 or 12.

23. The polyamide moulding composition according to claim 1, wherein said component (C) is present in a proportion of in the range of 20-60 wt %,
or wherein the fibrous reinforcing materials in component (C) are selected from glass fibres, and wherein in the case of flat glass fibres it is those having a dimensional ratio of more than 2 between the principal cross-sectional axis and the perpendicular secondary cross-sectional axis thereon which are used,
or wherein the particulate fillers in component (C) are selected from the group consisting of: titanium dioxide, zinc sulphide, barium sulphate, barium titanate, talc, mica, silicates, quartz, glass spheres, glass flakes, wollastonite, kaolin, silicas, magnesium carbonate, magnesium hydroxide, chalk, ground or precipitated calcium carbonate, lime, feldspar, metal powder, including iron powder, inorganic pigments, including iron oxide, iron manganese oxide, metal oxides, including spinels, including copper iron spinel, copper chromium oxide, copper chromite ($CuCr_2O_4$), zinc iron oxide, cobalt chromium oxide, cobalt aluminium oxide, magnesium aluminium oxide, copper chromium manganese mixed oxides, copper manganese iron mixed oxides, nickel antimony titanate, chromium antimony titanate, hard- or soft-magnetic metals or alloys/ceramics, hollow-sphere silicate fillers, alumina, boron nitride, boron carbide, aluminium nitride, calcium fluoride and mixtures or surface-treated forms thereof.

24. The polyamide moulding composition according to claim 1, wherein the proportion of component (D) is in the range of 5-10 wt %,
or wherein said component (D) when selected as polymers other than (A) is selected from the group consisting of: PA 56, PA 66, PA 610, PA 612, PA 6/12, PA 12, PA 11, PA 1010, PA 1012 and PA 1212, PA 6I/6T, PA 10I/10T, PA 10I/10T/BACI/BACT, PA MACMI/12, PA MACM12 and also mixtures or copolymers based on such systems,
or wherein said component (D) when selected as impact modifiers other than (B) is selected from the group consisting of: natural rubber, polybutadiene, polyisoprene, polyisobutylene, interpolymer of butadiene and/or of isoprene with styrene or styrene derivatives and other comonomers, hydrogenated interpolymer, interpolymer formed by grafting or copolymerization with acid anhydrides, (meth)acrylic acid and esters thereof, graft rubber having a crosslinked elastomeric core consisting of butadiene, isoprene or alkyl acrylates and having a graft sheath of polystyrene, polar or apolar olefin homo- and copolymer including ethylene-propylene rubber, ethylene-propylene-diene monomer rubber and ethylene-octene rubber, polar or apolar olefin homopolymer and copolymer formed by grafting or copolymerization with acid anhydrides, (meth)acrylic acid and esters thereof, carboxyl-functionalized copolymer including poly(ethene-co-(meth)acrylic acid) or poly(ethene-co-1-olefin-co-(meth)acrylic acid) and also mixtures or copolymers based on such systems.

25. The polyamide moulding composition according to claim 1, wherein the proportion of flame retardant in component (E) is in the range of 11-16 wt %,
or wherein the proportion of additives of component (F) is in the range of 0-4 wt %,
or wherein the additives of component (F) are selected from the following group or a mixture thereof: oxides, hydroxides, carbonates, silicates, borates, phosphates, stannates and also combinations or mixtures thereof, including oxide-hydroxides or oxide-hydroxide-carbonates.

26. A process for producing, providing or processing a polyamide moulding composition according to claim 1, wherein at least the components (A)-(B), optionally in addition also one, two or more or all components (C)-(F) are initially charged and mixed at a temperature of at least 300° C., in an extrusion process, for a period of at least 30 seconds, in a screw extruder, including single- or twin-screw extruder, a multi-screw extruder or an injection-moulding machine.

27. A component part produced from a polyamide moulding composition according to claim 1, said component part being a housing or a load-bearing structural element, for electrical or electronic applications or in the automotive sector, including connectors, loudspeakers, microphones, frame parts.

28. The polyamide moulding composition according to claim 1, wherein the ethylene-vinyl acetate copolymer of component (B) is grafted, with a system selected from the following group: acrylic acid, methacrylic acid, maleic acid, maleic anhydride, monobutyl maleate, fumaric acid, aconitic acid, glycidyl acrylate, glycidyl methacrylate and/or itaconic anhydride, or combinations thereof, wherein the ethylene-vinyl acetate copolymer has a graft in the range of 0.5-2.5%, wherein the percentages are each based on the overall mass of ethylene-vinyl acetate copolymer, including graft.

* * * * *